US012745081B2

(12) United States Patent
Thakur et al.

(10) Patent No.: US 12,745,081 B2
(45) Date of Patent: Sep. 22, 2026

(54) POINTER MECHANISMS FOR COMMUNICATING AUTHENTICATION AND KEY MANAGEMENT (AKM) AND CIPHERS

(71) Applicant: Apple Inc., Cupertino, CA (US)

(72) Inventors: Sidharth R. Thakur, San Jose, CA (US); Yong Liu, Campbell, CA (US); Jarkko L. Kneckt, Los Gatos, CA (US); Su Khiong Yong, Palo Alto, CA (US); Ahmad Reza Hedayat, Carlsbad, CA (US); Charles F. Dominguez, San Carlos, CA (US); Neelakantan Nurani Krishnan, San Diego, CA (US); Daniel R. Borges, San Francisco, CA (US); Jinjing Jiang, Campbell, CA (US); Lochan Verma, Danville, CA (US); Qi Wang, Sunnyvale, CA (US); Tianyu Wu, Monterey, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 18/899,976

(22) Filed: Sep. 27, 2024

(65) Prior Publication Data

US 2025/0106627 A1 Mar. 27, 2025

Related U.S. Application Data

(60) Provisional application No. 63/540,703, filed on Sep. 27, 2023.

(51) Int. Cl.
*H04W 12/06* (2021.01)
*H04W 12/0433* (2021.01)

(52) U.S. Cl.
CPC ....... *H04W 12/06* (2013.01); *H04W 12/0433* (2021.01)

(58) Field of Classification Search
None
See application file for complete search history.

(56) References Cited

U.S. PATENT DOCUMENTS

| | | | | |
|---|---|---|---|---|
| 2018/0132295 | A1* | 5/2018 | Wang | H04W 76/11 |
| 2022/0272783 | A1* | 8/2022 | Yang | H04L 5/0048 |
| 2024/0381077 | A1* | 11/2024 | Orr | H04W 12/041 |

OTHER PUBLICATIONS

Working Group of the LAN/MAN Standards Committee of the IEEE Computer Society, Part 11: Wireless LAN Medium Access Control (MAC) and Physical Layer (PHY) Specifications, IEEE p802.11-REVme /D3.0, Apr. 2023 (Year: 2023).*

* cited by examiner

*Primary Examiner* — Christopher C Harris
(74) *Attorney, Agent, or Firm* — Sterne, Kessler, Goldstein & Fox P.L.L.C.

(57) ABSTRACT

Some aspects of this disclosure include a system, apparatus, article of manufacture, method, and/or computer program product and/or combinations and/or sub-combinations thereof, for implementing multi-credential mapping mechanisms in wireless communication networks, such as a wireless local area network (WLAN). The multi-credential mapping mechanisms can use pointer schemes for communicating multiple credentials (e.g., Authentication and Key Managements (AKMs) and ciphers) in the wireless communication networks. The multi-credential mapping mechanisms can reduce congestion in the communication medium and improve the communications between an access point (AP) and stations (STAs).

20 Claims, 10 Drawing Sheets

| Group Suite ID Selector | Number of Suite ID Selectors | N Pairwise Suite ID Selectors |
| --- | --- | --- |
| 0 | 1 | 2 |

449 453 455

POINTER MECHANISMS FOR COMMUNICATING AUTHENTICATION AND KEY MANAGEMENT (AKM) AND CIPHERS

CROSS-REFERENCE TO RELATED APPLICATIONS

The present application claims the benefit of U.S. Provisional Patent Application No. 63/540,703, filed on Sep. 27, 2023, which is incorporated by reference herein in its entirety.

BACKGROUND

Field

The described aspects generally relate to security mechanisms in wireless communications.

Related Art

One or more access points (APs) can communicate with one or more stations (STAs) using security mechanisms. The AP can support multiple credentials (e.g., Authentication and Key Managements (AKMs) and ciphers). Similarly, the STA can support multiple credentials (e.g., AKMs and ciphers). The AP can transmit a set of AKMs and ciphers it supports to the STAs communicating with the AP. Each STA can choose the AKM(s) and cipher(s) it supports from the set of AKMs and ciphers from the AP. The STA can send the chosen AKM(s) and cipher(s) to the AP to let the AP know the AKM(s) and cipher(s) that the STA supports. The current format used to communicate the set of supported AKMs and ciphers is complicated and can cause parsing issues. Further, APs may advertise differing sets of supported AKMs and ciphers on different bands, resulting in ambiguous configuration choices on the receiving STA.

SUMMARY

Some aspects of this disclosure include a system, apparatus, article of manufacture, method, and/or computer program product and/or combinations and/or sub-combinations thereof, for implementing multi-credential mapping mechanisms in wireless communication networks, such as a wireless local area network (WLAN). The multi-credential mapping mechanisms can use pointer schemes for communicating multiple credentials (e.g., Authentication and Key Managements (AKMs) and ciphers) in the wireless communication networks. According to some aspects, each combination of AKM and cipher that is advertised using multi-credential mapping mechanisms is atomic. The multi-credential mapping mechanisms can reduce congestion in the communication medium and improve the communications between an access point (AP) and stations (STAs).

Some aspects of this disclosure relate to an electronic device. The electronic device includes a transceiver configured to communicate over a wireless network and a processor communicatively coupled to the transceiver. The processor is configured to receive, using the transceiver and from a second electronic device, a first information element (IE), where the first IE includes a first set of pointers indicating a first set of security suites. The processor is further configured to transmit, using the transceiver and to the second electronic device, a second IE, where the second IE includes a second set of pointers indicating a second set of security suites selected from the first set of security suites indicated by the second electronic device. The processor is further configured to receive, using the transceiver and from the second electronic device, a response indicating that the second electronic device confirms the second set of security suites. The processor is further configured to use the second set of security suites for communicating with the second electronic device.

In some aspects, the electronic device further includes a memory that stores a first security suite table and a second security suite table, and the processor is further configured to determine the second set of security suites from the first and second security suite tables using the first set of pointers in the first IE. The second electronic device can have the same first and second security suite tables as the first electronic device.

In some aspects, the processor is configured to receive the first IE in a beacon frame from the second electronic device. In some aspects, the processor is configured to receive the first IE in a probe response frame from the second electronic device.

In some aspects, the processor is configured to receive the response indicating that the second electronic device confirms the second IE in an association response frame from the second electronic device. In some aspects, the processor is configured to transmit the second IE using an association request frame to the second electronic device. In some aspects, the processor is configured to transmit the second IE in response to a selection of one or more credentials at the electronic device In some aspects, at least one of the first IE or the second IE includes a group suite identifier (ID) selector field and one or more pairwise suite ID selector fields. The first IE or the second IE further includes a number of suite ID selectors field indicating a number of the one or more pairwise suite ID selector fields. The group suite ID selector field of the first IE includes a pointer of the first set of pointers indicating a row in a first security suite table. The group suite ID selector field of the second IE includes a pointer of the second set of pointers indicating the row in the first security suite table. In other words, the pointer of the second set of pointers of the second IE is the same as the pointer of the first set of pointers of the first IE. The one or more pairwise suite ID selector fields of the first IE include one or more pointers of the first set of pointers indicating a row in a second security suite table. The one or more pairwise suite ID selector fields of the second IE include a single pointer of the second set of pointers selected from the one or more pointers of the first set of pointers of the first IE.

Some aspects of the disclosure relate to a method including receiving, by a first electronic device and from a second electronic device, a first enhanced security selector suite information element (IE), where the first enhanced security selector suite IE includes a first set of pointers indicating a first set of security suites. The method further includes transmitting, to the second electronic device, a second enhanced security selector suite IE, where the second enhanced security selector suite IE includes a second set of pointers selected from the first set of pointers indicating a second set of security suites. The method further includes receiving, from the second electronic device, a response indicating that the second electronic device confirms the second enhanced security selector suite IE. The method further includes using the second set of one or more security suites for communicating with the second electronic device.

Some aspects of the disclosure relate to a non-transitory computer-readable medium storing instructions that, when executed by a processor of a first electronic device, cause the processor to perform operations including receiving, from a second electronic device, a first enhanced security selector suite information element (IE), where the first enhanced security selector suite IE includes a first set of pointers indicating a first set of security suites. The operations further include transmitting, to the second electronic device, a second enhanced security selector suite IE, where the second enhanced security selector suite IE includes a second set of pointers indicating a second set of security suites. The operations further include receiving, from the second electronic device, a response indicating that the second electronic device confirms the second set of security suites. The operations further include using the second set of security suites for communicating with the second electronic device.

Some aspects of this disclosure relate to an electronic device. The electronic device includes a transceiver configured to communicate over a wireless network and a processor communicatively coupled to the transceiver. The processor is configured to transmit, using the transceiver and to a second electronic device, a first enhanced security selector suite information element (IE), where the first enhanced security selector suite IE includes a first set of pointers indicating a first set of security suites. The processor is further configured to receive, using the transceiver and from the second electronic device, a second enhanced security selector suite IE, where the second enhanced security selector suite IE includes a second set of pointers indicating a second set of security suites selected from the first set of security suites indicated by the second electronic device. The processor is further configured to transmit, using the transceiver and to the second electronic device, a response confirming the second set of security suites. The processor is further configured to use the second set of security suites for communicating with the second electronic device.

Some aspects of this disclosure relate to a method including transmitting, by a first electronic device and to a second electronic device, a first enhanced security selector suite information element (IE), where the first enhanced security selector suite IE includes a first set of pointers indicating a first set of security suites. The method further includes receiving, by the first electronic device and from the second electronic device, a second enhanced security selector suite IE, where the second enhanced security selector suite IE includes a second set of pointers indicating a second set of security suites. The method further includes transmitting, by the first electronic device and to the second electronic device, a response confirming the second enhanced security selector suite IE. The method further includes using the second set of one or more security suites of the second enhanced security selector suite IE for communicating with the second electronic device.

Some aspects of the disclosure relate to a non-transitory computer-readable medium storing instructions that, when executed by a processor of a first electronic device, cause the processor to perform operations including transmitting, to a second electronic device, a first enhanced security selector suite information element (IE), where the first enhanced security selector suite IE includes a first set of pointers indicating a first set of security suites. The operations further include receiving, from the second electronic device, a second enhanced security selector suite IE, where the second enhanced security selector suite IE includes a second set of pointers indicating a second set of security suites. The operations further include transmitting, to the second electronic device, a response confirming the second enhanced security selector suite IE. The operations further include using the second set of security suites of the second enhanced security selector suite IE for communicating with the second electronic device.

This Summary is provided for purposes of illustrating some aspects of the disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
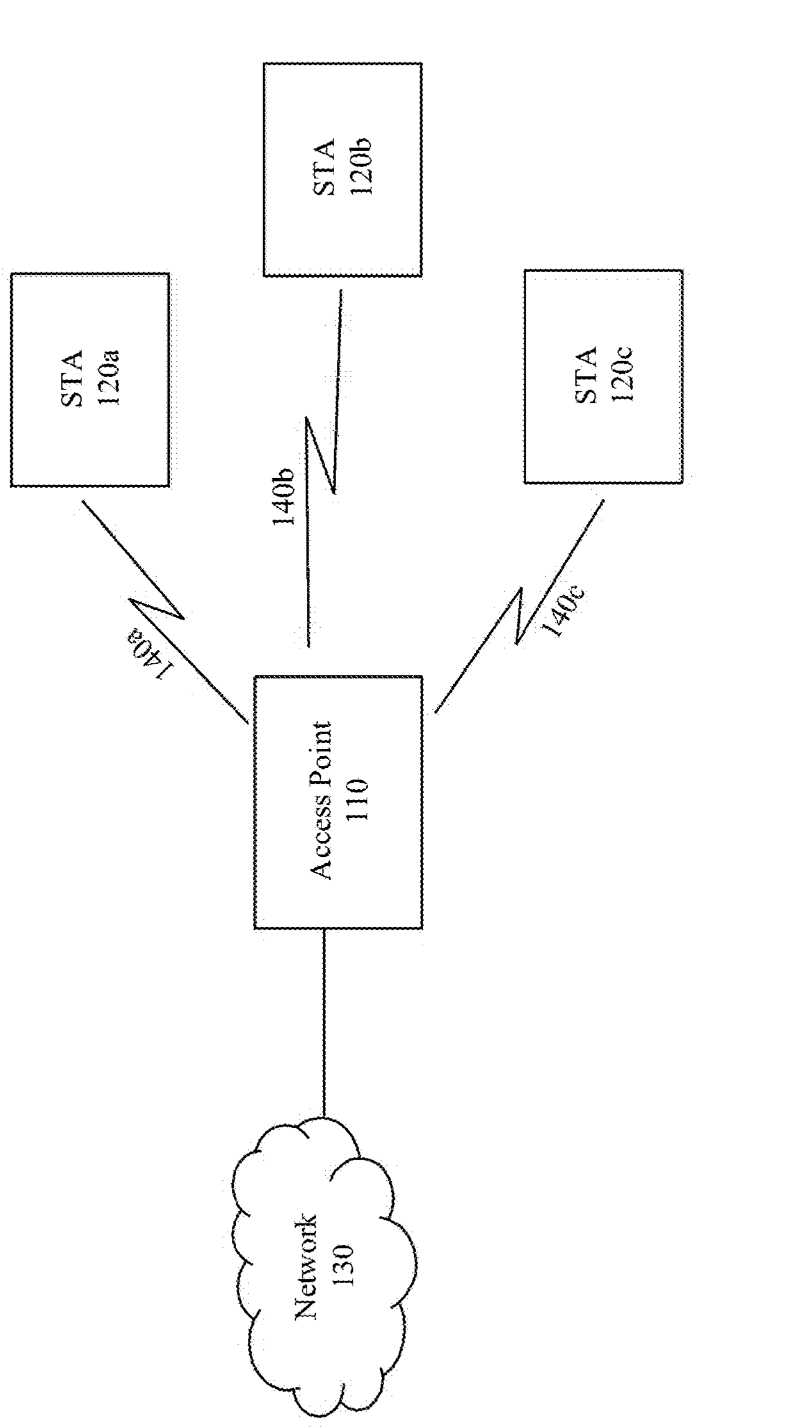
FIG. 1 illustrates an example system implementing multi-credential mapping mechanisms in a communication network, according to some aspects.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include a system, apparatus, article of manufacture, method, and/or computer program product and/or combinations and/or sub-combinations thereof, for implementing multi-credential mapping mechanisms in wireless communication networks, such as a wireless local area network (WLAN). The multi-credential mapping mechanisms can use pointer schemes for communicating multiple credentials (e.g., Authentication and Key Managements (AKMs) and ciphers) in the wireless communication networks. The multi-credential mapping mechanisms can reduce congestion in the communication medium and improve the communications between an access point (AP) and stations (STAs). The multi-credential mapping mechanisms can alleviate the problem of beacon bloat by being efficient with the information that is transmitted over the air (OTA). Additionally, or alternatively, they can reduce confusion caused because the current architecture allows almost any combination of security suite elements to be used simultaneously.

According to some aspects, the multi-credential mapping mechanisms can be implemented with communication techniques compatible with Institute of Electrical and Electronics Engineers (IEEE) 802.11 standards (such as, but not limited to, IEEE 802.11n, IEEE 802.11i, IEEE 802.11ac, IEEE 802.11s, IEEE 802.11ax, IEEE 802.11r, IEEE 802.11be, etc.). For example, the multi-credential mapping mechanisms can be implemented with communication techniques compatible with WiFi™ Protected Access (WPA) security standards such as, but not limited to, WPA, WPA2, WPA3, WPA3 Hash to Element (H2E), WPA3 Hunting and Pecking (HnP), etc. The multi-credential mapping mechanisms can be implemented with communication techniques compatible with Simultaneous Authentication of Equals (SAE) authentication methods. However, the aspects of this disclosure can also be applied to operations in other communication networks operating in accordance with any protocol(s).

FIG. 1 illustrates an example system 100 implementing the multi-credential mapping mechanisms in a communication network, according to some aspects. Example system 100 is provided for the purpose of illustration only and does not limit the disclosed aspects.

System 100 can include, but is not limited to, access point (AP) 110, stations (STAs) 120 (also referred to as clients), and network 130. The STAs 120*a*-120*c* can include, but are not limited to, WLAN electronic devices such as wireless communication devices, smart phones, laptops, desktops, tablets, personal assistants, monitors, televisions, wearable devices, gaming devices, Internet of Thing (IoT) devices, and the like. The AP 110 can include but is not limited to WLAN electronic devices such as a wireless router, a wearable device (e.g., a smart watch), a wireless communication device (e.g., a smart phone), a gaming device, or a combination thereof.

Network 130 can be the Internet and/or a WLAN. The STA 120's communications are shown as wireless communications 140. The communication between the AP 110 and the STA 120 can take place using wireless communications 140*a*-140*c*. The wireless communications 140*a*-140*c* can be based on a wide variety of wireless communication techniques. These techniques can include, but are not limited to, techniques based on IEEE 802.11 (such as, but not limited to IEEE 802.11ac, IEEE 802.11ax, IEEE 802.11bc, IEEE 802.11bd, IEEE 802.11be, IEEE 802.11v, etc. standards).

According to some aspects, the system 100 can include a multi-link communication network. For example, the AP 110 and the STAs 120 can be configured to implement a multi-link communication. In other words, the AP 110 and the STAs 120 are configured to implement and support simultaneous or substantially simultaneous data transfer using multiple MAC/PHY links. However, the aspects of this disclosure can also be applied to operations in other communication networks.

The AP 110 and the STAs 120 can use a security mechanism to secure the communications between the AP 110 and the STAs 120. According to some aspects, the security mechanism can include WiFi™ Protected Access (WPA) security standards such as, but not limited to, WPA, WPA2, WPA3, WPA3 Hash to Element (H2E), WPA3 Hunting and Pecking (HnP), etc. WPA security standard was developed from Wired Equivalent Privacy (WEP) security standard. WPA2 security standard was developed from WPA security standard, and WPA3 security standard was developed from WPA2 security standard.

One problem with current security mechanisms is that some STAs cannot be able to parse the WPA3 information element (IE). Another problem with the current security mechanisms is that the combination of WPA2 and WPA3 security standards on a network is vulnerable to attacks because WPA2 security standard is vulnerable to attacks. For example, same passphrase maybe used for both WPA3 and WPA2 security standards. Since WPA2 security standard is vulnerable to attacks, a detected (e.g., attacked and stolen) passcode for the WPA2 security standard can be used to attack WPA3 security standard.

Another problem with current security mechanisms is that WPA2 security standard is disallowed on 6 GHz bands. Therefore, the APs are supporting WPA3 security standard and WPA3 transition mode. The WPA3 transition mode is a mode where the WPA2 security standard and the WPA3 security standard AKMs are advertised on the same IE, which can result in parsing problems in non-updated STAs.

In some examples, WiFi™ 7 can aggregate two or more links into one virtual aggregated link. In some examples, the 6 GHz link can use WPA3 security standard where the 5 GHz link and 2.4 GHz link use WPA3 transition mode. A WiFi™ 7 STA can move from using the 6 GHz link and the 5 GHz link to the 5 GHz link and the 2.4 GHz link. A non-WiFi™ 7 STA can move from the 6 GHz link to the 5 GHz link. In current security mechanisms, if a STA moves from the 6 GHz link to the 5 GHz link or the 2.4. GHz link, if the AP does not prove its identity using a beacon integrity protection scheme, the STA cannot determine the AP is a valid AP that is advertising a lower security mechanism (e.g., WPA2 security standard) on the 5 GHz link or the 2.4. GHz link.

In some examples of current security mechanisms, if a first AP supports WPA3 security standard on the three links (e.g., 2.4 GHz, 5 GHz, and 6 GHz links), but a second AP supports the WPA3 transition mode on at least one link, the STA cannot determine that the second AP is a valid AP because lower security mechanisms (e.g., WPA2 security standard) are being advertised by the second AP. In some examples that the AP supports the WPA3 transition mode, the AP can find legacy STAs that do not support this transition mode.

In some examples of current security mechanisms, different network service set identifiers (SSIDs) can be used for different WPA security standards. For example, a first network SSID can be used for the WPA3 security standard and a second network SSID can be used for the WPA3 transition mode. However, this method can result in user confusion as to which network SSID to use for which STAs. Also, this method can result in user confusion as to which networks connect.

Some aspects of this disclosure address these issues by providing systems and methods for implementing multi-credential mapping mechanisms in wireless communication networks, such as a WLAN. The multi-credential mapping mechanisms, as discussed with respect to FIGS. 1-7, can use pointer schemes for communicating multiple credentials (e.g., AKMs and ciphers) in the wireless communication networks. The multi-credential mapping mechanisms can reduce congestion in the communication medium and improve the communications between the AP 110 and the STAs 120.

According to some aspects, as discussed in more detail below, the multi-credential mapping mechanisms of this disclosure can reuse a current set of AKMs defined by the IEEE standards (e.g., IEEE 802.11 standards) for backward compatibility. Additionally, the multi-credential mapping mechanisms can create a new information element (IE) to resolve parsing issues discussed above. The multi-credential mapping mechanisms can communicate intended AKM(s) without explicit over the air transmission of AKM(s)/cipher suite(s)/group cipher suite combination(s). For example, using the multi-credential mapping mechanisms, the AP 110 and the STAs 120 can use one or more tables (e.g., one or more standardized tables) of combinations (e.g., AKM(s)/cipher suite(s)/group cipher suite combination(s)) that are stored in a memory of the AP 110 and/or the STAs 120. The AP 110 and the STAs 120 can communicate pointers to, for example, row(s) within the table(s) instead of communicating the AKM(s)/cipher suite(s)/group cipher suite combination(s).

According to some aspects, the multi-credential mapping mechanisms decouple from existing IEs. These mechanism can keep security configuration explicit from physical (PHY) IEs and can ensure issues with an existing Robust Security Network (RSN) IE is not repeated. According to some aspects, the multi-credential mapping mechanisms allow upgrades to group ciphers in case legacy STAs depart a Basic Service Set (BSS) and only STAs that support stronger group ciphers are present.

According to some aspects, the AP 110 and the STAs 120 can use an enhanced security selector suite information element (IE) for communicating one or more pointers to AKM(s), cipher suite(s), and/or group cipher suite combination(s). The enhanced security selector suite IE can be used to simplify parsing. Each enhanced security selector suite IE can include a plurality of fields. The plurality of fields of the enhanced security selector suite IE can include one or more security suites that are atomic. The security suite can include a selector field and a control flag field. The selector field is a pointer that points to a suite ID from a table that is stored in the AP 110 and/or in the STA 120. Therefore, instead of transmitting AKM(s), cipher suite(s), and/or group cipher suite combination(s), the enhanced security selector suite IE is configured to transmit pointers (e.g., selector field of security suite).

In other words, the AP 110 is configured to send suite IDs (e.g., pointers) that the AP 110 supports using the selector fields of the security suite of the enhanced security selector suite IE. The AP 110 is further configured to enable or disable the suite ID using the enhanced security selector suite IE. The suite ID is a unique ID for each row of the table stored in the AP 110 and/or STA 120. Similarly, the STA 120 is configured to send suite IDs (e.g., pointers) that the STA 120 supports using the selector fields of the security suite of the enhanced security selector suite IE.

Additionally, or alternatively, to having one or more security suites, the enhanced security selector suite IE can include (1) a group suite ID selector field and (2) one or more pairwise suite ID selector fields for communicating pointers to AKM(s), cipher suite(s), and/or group cipher suite combination(s). The group suite ID selector field and the one or more pairwise suite ID selector fields include pointers for indicating security suites. For example, the group suite ID selector field includes a pointer for indicating a security suite including group ciphers and group integrity protection ciphers. Each one of the one or more pairwise suite ID selector fields includes a pointer for indicating a security suite including AKMs and pairwise ciphers.

More specifically, the group suite ID selector field of the enhanced security selector suite IE includes a pointer (group cipher suite ID) that points to a row of a group cipher suite selector table. The group cipher suite selector table includes a list of tuples. Each tuple is a valid combination of group cipher and group integrity protection cipher. In other words, the group cipher suite ID is a unique ID for each row of the group cipher suite selector table. The group ciphers and group integrity protection ciphers are combined into atomic combinations. The group cipher suite selector table is stored in the AP 110 and/or the STA 120. The group cipher suite selector table allows for future expansions without changing OTA formats. For example, new rows can be added to the group cipher suite selector table to provide new security suites (e.g., tuple of group cipher and group integrity protection cipher) with a new group cipher suite ID.

Each pairwise suite ID selector field of the one or more pairwise suite ID selector fields of the enhanced security selector suite IE includes a pointer (pairwise suite ID) that points to a row of a pairwise security suite selector table. The pairwise security suite selector table includes a list of tuples. Each tuple is a valid combination of AKM and pairwise cipher. In other words, each pairwise suite ID is a unique ID for each row of the pairwise security suite selector table. The AKMs and pairwise ciphers are combined into atomic combinations. The pairwise security suite selector table is stored in the AP 110 and/or the STA 120. The pairwise security suite selector table allows for future expansions without changing OTA formats. For example, new rows can be added to the pairwise security suite selector table to provide new security suites (e.g., tuple of AKM and pairwise cipher) with a new pairwise suite ID.

Figure 2:
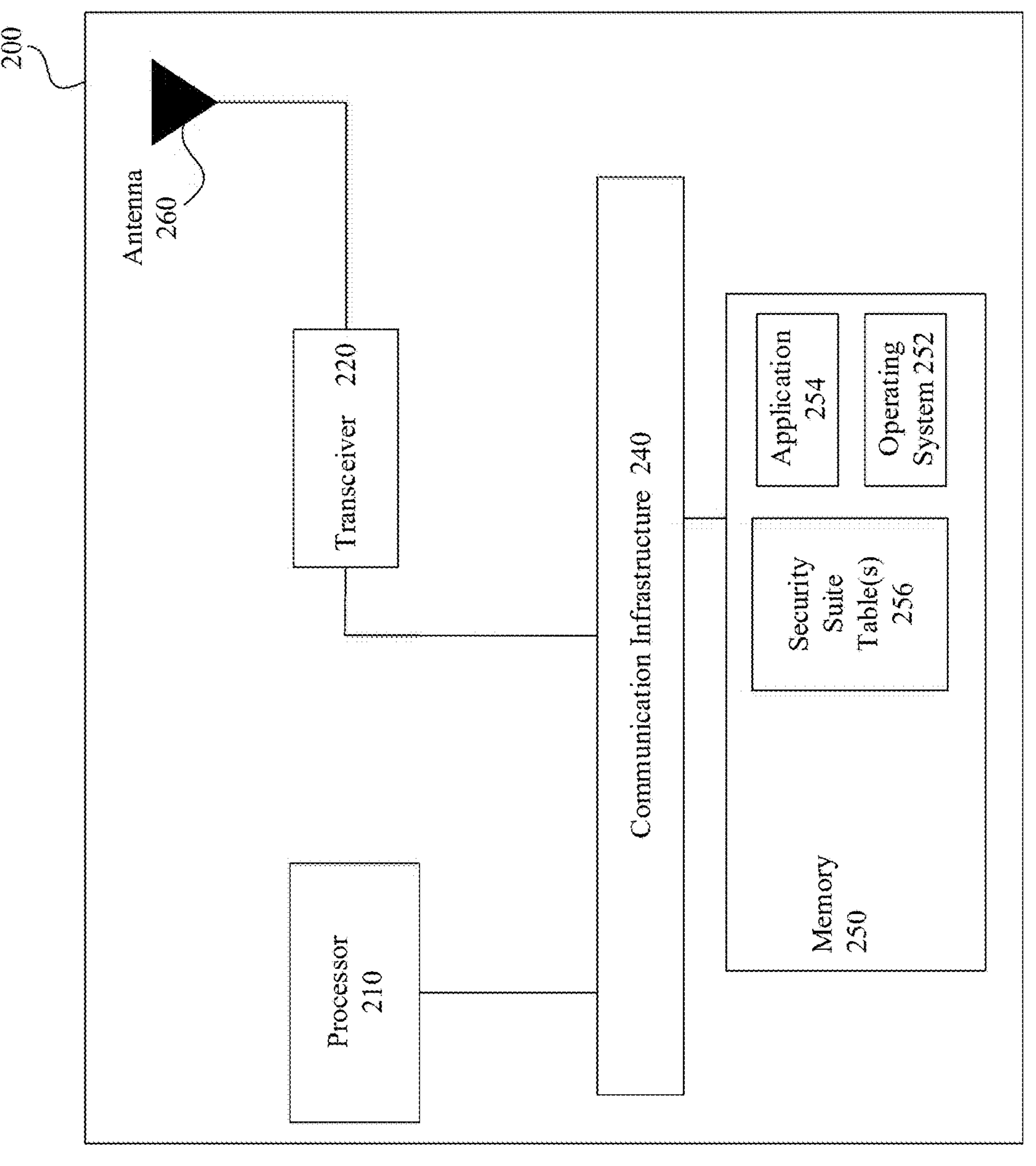
FIG. 2 illustrates a block diagram of an example wireless system of an electronic device implementing the multi-credential mapping mechanisms in a communication network, according to some aspects.

FIG. 2 illustrates a block diagram of an example wireless system 200 of an electronic device implementing the multi-credential mapping mechanisms a communication network, according to some aspects. System 200 can be any of the electronic devices (e.g., AP 110, STA 120) of system 100. System 200 includes processor 210, one or more transceivers 220, communication infrastructure 240, memory 250, operating system 252, application 254, security suite table(s) 256, and one or more antennas 260. Illustrated systems are provided as exemplary parts of the wireless system 200, and the system 200 can include other circuit(s) and subsystem(s). Also, although the systems of wireless system 200 are illustrated as separate components, the aspects of this disclosure can include any combination of these, less, or more components.

The memory 250 can include random access memory (RAM) and/or cache, and can include control logic (e.g., computer software) and/or data. The memory 250 can include other storage devices or memory such as, but not limited to, a hard disk drive and/or a removable storage device/unit. According to some examples, the operating system 252 can be stored in the memory 250. The operating system 252 can manage transfer of data from the memory 250 and/or one or more applications 254 to the processor 210 and/or the one or more transceivers 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by the wireless system 200 and/or a user of the wireless system 200. The applications in the application 254 can include applications such as, but not limited to, audio/video communication applications, radio streaming, video streaming, remote control, gaming application(s), and/or other user applications.

According to some aspects, the security suite table(s) 256 can be stored in memory 250. The security suite table(s) 256 can include information and/or a set of security parameters used for the secure communication between the AP and the STAs. The security suite table(s) 256 can be used by the AP and/or the STA for generating the enhanced security selector suite IE. In other words, the enhanced security selector suite IE can include one or more pointers that point to, for example, row(s) of the security suite table(s) 256. The security suite table(s) 256 can include the AKM(s), cipher suite(s), and/or group cipher suite combination(s) used for the secure communication between the AP and the STAs. Although one security suite table 256 is shown, system 200 can have any number of security suite tables 256. As discussed in more detail below, the security suite table(s) 256 can include one or more of Table 1, Table 2, and Table 3.

According to some aspects, the security suite tables 256 can include (1) the group cipher suite selector table and (2) the pairwise security suite selector table. The group cipher suite selector table includes a list of tuples that are valid combination of group cipher and group integrity protection cipher. The pairwise security suite selector table includes a list of tuples that are valid combination of AKM and pairwise cipher.

Table 1 below shows an example of a security suite table. It is noted that Table 1 is provided as one example and does not limit the aspects of this disclosure. The security suite table can include additional (or fewer) rows and/or column. Also, the values provided in Table 1 are exemplary values and do not limit the aspects of this disclosure.

TABLE 1

Exemplary Security Suite Table

| Suite ID | Name | AKM | Pair-wise Cipher | Group Cipher | Group Integrity Pro-tection Cipher |
|---|---|---|---|---|---|
| 0 | WPA3-Personal 192-bit | 24 | 9 | 9 | 12 |
| 1 | WPA3-Personal 192-bit + Fast Transition (FT) | 25 | 9 | 9 | 12 |
| 6 | WPA3 Personal CCMP256 | 24 | 10 | 10 | 13 |
| 7 | WPA3 Personal CCMP256 + FT | 25 | 10 | 10 | 13 |
| 3 | WPA3 Enterprise 192-bit | 12 | 9 | 9 | 12 |
| 2 | WPA3 Enterprise 192-bit + FT | 13 | 9 | 9 | 12 |
| 5 | WPA3 Enterprise CCMP256 | 12 | 10 | 10 | 13 |
| 4 | WPA3 Enterprise CCMP256 + FT | 13 | 10 | 10 | 13 |

Table 1 is an example of the security suite table 256 that can be stored in the AP (e.g., AP 110) and/or the STAs (e.g., STAs 120) and can define a list of valid AKM and cipher combinations. The security suite table 256 can allow future expansion without changing OTA formats. New rows can be added to the security suite table 256 to provide new security suites with new corresponding suite IDs. New columns can be added to the security suite table 256 to add features in suites (implicitly not available (N/A) in legacy suites).

According to some aspects, each row of the security suite table 256 can be indicted by a suite ID. The suite ID is used by the AP and/or the STA as the pointer in the enhanced security selector suite IE used by the AP and/or the STA. Each suite ID can indicate the name of the security mechanism used for that suite ID. Similarly, each suite ID can indicate the AKM, the cipher pairwise, the group cipher, and/or the group integrity protection cipher used for that suite ID. According to some examples, the AKM is used to identify the authentication supported on an SSID. Each AKM uses a very unique identification that represents a very specific authentication type. In some examples, the pairwise cipher is used for unicast data between the STA and AP, and the group cipher is used for broadcast/multicast traffic from the AP to multiple STAs. However, the aspects of disclosure are not limited to these examples. According to some aspects, the security mechanism, the values of AKMs, the values of pairwise ciphers, the values of group ciphers, and/or the values of group integrity protection ciphers can be defined in, for example, IEEE 802.11 standards and associated WPA standards/specifications. For example, these values can be defined in Table 9-186 through Table 9-188 of IEEE P802.11 REVme June 2022, which is incorporated herein in its entirety.

According to some aspects, the suite ID is unique to each row of the security suite table 256. A recipient device (e.g., the AP and/or the STA) can determine a set of AKM, pairwise/group/integrity ciphers to use based on the suite ID. As discussed in more detail below, the suite ID is communicated using the enhanced security selector suite IE. According to some aspects, the AP can enable or restrict use of more than one selector suite for future STAs at a given time. Additionally, or alternatively, the dynamic modification of group ciphers is possible and therefore, the enhanced security selector suite IE can be updated accordingly.

According to some aspects, the security suite tables 256 can include (1) the group cipher suite selector table and (2) the pairwise security suite selector table. The group cipher suite selector table includes a list of tuples that are valid combination of group cipher and group integrity protection cipher. The pairwise security suite selector table includes a list of tuples that are valid combination of AKM and pairwise cipher.

Table 2 below shows an example of a pairwise security suite selector table. Table 3 below shows an example of a group cipher suite selector table. It is noted that Tables 2 and 3 are provided as one example and do not limit the aspects of this disclosure. The pairwise security suite selector table and/or the group cipher suite selector table can include additional (or fewer) rows and/or column. Also, the values provided in Tables 2 and 3 are exemplary values and do not limit the aspects of this disclosure.

TABLE 2

Exemplary Pairwise Security Suite Selector Table

| Pairwise Suite ID | Name | AKM | Pairwise Cipher |
|---|---|---|---|
| 0 | WPA3-Personal CCMP256 | 24 | 9 |
| 1 | WPA3-Personal CCMP256 + FT | 25 | 9 |
| 2 | WPA3 Enerprise CCMP256 | 12 | 9 |
| 3 | WPA3 Enerprise CCMP256 + FT | 13 | 9 |
| N | Future Suites . . . (WPA4) | | |

TABLE 3

Exemplary Group Cipher Suite Selector Table

| Group Cipher Suite ID | Name | Group Cipher | Group Integrity Protection Cipher |
|---|---|---|---|
| 0 | CCMP-128 + BIP-CMAC-128 | 4 | 6 |
| 1 | GCMP-128 + BIP-GMAC-128 | 8 | 11 |
| 2 | GCMP-256 + BIP-GMAC-256 | 9 | 12 |
| 3 | CCMP-256 + BIP-CMAC-256 | 10 | 13 |
| N | Future Suites . . . | | |

Tables 2 and 3 are examples of the security suite tables 256 that can be stored in the AP (e.g., AP 110) and/or the STAs (e.g., STAs 120) and can define a list of valid AKM and cipher combinations. For example, the AP and the STAs can store the same copies of the Tables 1-3. The security suite tables 256 can allow future expansion without changing OTA formats. New rows can be added to the security suite tables 256 to provide new security suites with new corresponding suite IDs. New columns can be added to the security suite tables 256 to add features in suites (implicitly not available (N/A) in legacy suites).

According to some aspects, each row of the pairwise security suite selector table (Table 2 as an example of the security suite tables 256) can be indicted by a pairwise suite ID. The pairwise suite ID is used by the AP and/or the STA as the pointer in the enhanced security selector suite IE used by the AP and/or the STA. Each pairwise suite ID can indicate the name of the security mechanism used for that pairwise suite ID. Similarly, each pairwise suite ID can indicate the AKM and/or the cipher pairwise used for that pairwise suite ID. Each pairwise suite ID indicates an atomic pairwise AKM/cipher combination. According to some examples, the AKM is used to identify the authentication supported on an SSID. Each AKM uses a very unique identification that represents a very specific authentication type. In some examples, the pairwise cipher is used for unicast data between the STA and AP. However, the aspects of disclosure are not limited to these examples. According to some aspects, the security mechanism, the values of AKMs and/or the values of pairwise ciphers can be defined in, for example, IEEE 802.11 standards and associated WPA standards/specifications. For example, these values can be defined in Table 9-186 through Table 9-188 of IEEE P802.11 REVme June 2022, which is incorporated herein in its entirety.

According to some aspects, the pairwise suite ID is unique to each row of the pairwise security suite selector table (Table 2 as an example of the security suite tables 256). A recipient device (e.g., the AP and/or the STA) can determine a set of AKM and/or pairwise cipher to use based on the pairwise suite ID. As discussed in more detail below, the pairwise suite ID is communicated using the enhanced security selector suite IE.

According to some aspects, each row of the group cipher suite selector table (Table 3 as an example of the security suite tables 256) can be indicted by a group cipher suite ID. The group cipher suite ID is used by the AP and/or the STA as the pointer in the enhanced security selector suite IE used by the AP and/or the STA. Each group cipher suite ID can indicate the name of the security mechanism used for that group cipher suite ID. Similarly, each group cipher suite ID can indicate the group cipher and/or the group integrity protection cipher used for that group cipher suite ID. Each group cipher suite ID identifies an atomic group cipher/group integrity protection cipher. According to some examples, the group cipher is used for broadcast/multicast traffic from the AP to multiple STAs. However, the aspects of disclosure are not limited to these examples. According to some aspects, the security mechanism, the values of group ciphers and/or the values of group integrity protection ciphers can be defined in, for example, IEEE 802.11 standards and associated WPA standards/specifications. For example, these values can be defined in Table 9-186 through Table 9-188 of IEEE P802.11 REVme June 2022, which is incorporated herein in its entirety.

According to some aspects, the group cipher suite ID is unique to each row of the group cipher security suite selector table (Table 3 as an example of the security suite tables 256). A recipient device (e.g., the AP and/or the STA) can determine a set of group/integrity ciphers to use based on the group cipher suite ID. As discussed in more detail below, the group cipher suite ID is communicated using the enhanced security selector suite IE.

According to some aspects, each row of Table 3 can include information associated with different frequencies and/or frequency channels. For example, a specific group cipher suite ID can refer to multiple group ciphers and group integrity protection ciphers for multiple frequencies and/or frequency channels. For example, a specific group cipher suite ID can refer to a first group cipher and a first group integrity protection cipher for a first frequency (e.g., a 2.4 GHz channel and/or a 5 GHz channel) and also refer to a second group cipher and a second group integrity protection cipher for a second frequency (e.g., 6 GHz channel).

System 200 can also include the communication infrastructure 240. The communication infrastructure 240 provides communication between, for example, the processor 210, the one or more transceivers 220, and the memory 250. In some implementations, the communication infrastructure 240 can be a bus. The processor 210 together with instructions stored in the memory 250 performs operations enabling the wireless system 200 of the system 100 to implement the multi-credential mapping mechanisms as described herein. Additionally, or alternatively, the one or more transceivers 220 perform operations enabling the wireless system 200 of system 100 to implement the multi-credential mapping mechanisms as described herein.

The one or more transceivers 220 transmit and receive communications signals that support the multi-credential mapping mechanisms, according to some aspects, and can be coupled to the one or more antennas 260. (Herein, transceivers can also be referred to as radios). The antenna 260 can include one or more antennas that can be the same or different types.

The one or more transceivers 220 allow system 200 to communicate with other devices that can be wired and/or wireless. In some examples, the one or more transceivers 220 can include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220 can include more or fewer systems for communicating with other devices.

In some examples, the one or more transceivers 220 can include one or more circuits (including a cellular transceiver) for connecting to and communicating on cellular networks. The cellular networks can include, but are not limited to, 3G/4G/5G/6G networks such as Universal Mobile Telecommunications System (UMTS), Long-Term Evolution (LTE), and the like.

Additionally, or alternatively, the one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver **220*n*** can include a Bluetooth™ transceiver.

Additionally, the one or more transceivers 220 can include one or more circuits (including a WLAN transceiver) to enable connection(s) and communication over WLAN networks such as, but not limited to, networks based on standards described in IEEE 802.11 (such as, but not limited to IEEE 802.11ac, IEEE 802.11ax, IEEE 802.11bc, IEEE 802.11bd, IEEE 802.11be, etc.). For example, one transceiver of the one or more transceivers 220 can enable connection(s) and communication over a WLAN (e.g., a multi-link WLAN) having a first link associated with a 2.4 GHz wireless communication channel. For example, one transceiver of the one or more transceivers 220 can enable connection(s) and communication over the WLAN having a second link associated with a 5 GHz wireless communication channel. For example, one transceiver of the one or more transceivers 220 can enable connection(s) and communication over the WLAN having a third link associated with a 6 GHz wireless communication channel. However, the aspects of this disclosure are no limited to these wireless channels and other PHY layer links and/or other wireless channels can be used.

Additionally, or alternatively, the wireless system 200 can include one WLAN transceiver configured to operate at two or more links. The processor 210 can be configured to control the one WLAN transceiver to switch between different links, according to some examples. For example, one transceiver of the one or more transceivers 220 can enable connection(s) and communication over a WLAN having a first link associated with a 2.4 GHz wireless communication channel. And one transceiver of the one or more transceivers 220 can enable connection(s) and communication over the WLAN having a second link associated with a 5 GHz wireless communication channel and can enable connection (s) and communication over the WLAN having a third link associated with a 6 GHz wireless communication channel. According to some aspects, the switching from the first link to the second link can include using a transceiver associated with the second link instead of the transceiver associated with the first link. Additionally, or alternatively, the switching from the first link to the second link can include controlling a single transceiver to operate at the frequency of the second link instead of operating at the frequency of the first link.

According to some aspects, system 200 can optionally include one or more receiver(s) (not shown) that can be a receive-only receiver, for example, a receive-only auxiliary radio (e.g., a scan radio).

According to some aspects of this disclosure, the processor 210, alone or in combination with computer instructions stored within the memory 250, and/or the one or more transceivers 220 implements the multi-credential mapping mechanisms as discussed herein. As discussed in more detail below with respect to FIGS. 3-6, the processor 210 can implement the multi-credential mapping mechanisms of FIGS. 1 and 2.

Figure 3A:
FIG. 3A illustrates an example information element (IE) for implementing multi-credential mapping mechanisms in a communication network, according to some aspects.
Figure 3A:
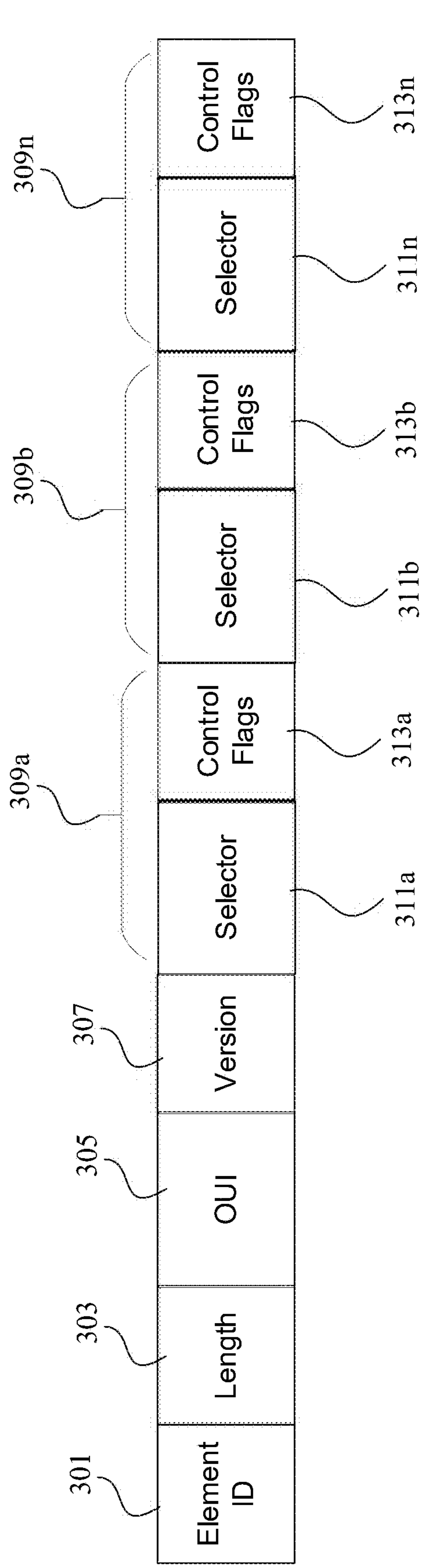

FIG. 3A illustrates an example information element (IE) 300 for implementing multi-credential mapping mechanisms in a communication network, according to some aspects. The IE 300 can be one example of the enhanced security selector suite IE that the AP and/or the STA use to communicate the suite IDs, which points to row(s) of the security suite table.

The IE 300 can include a plurality of fields. Although some exemplary fields are discussed with respect to FIG. 3A, the IE 300 (e.g., the enhanced security selector suite IE) can include additional fields. The IE 300 can include other fields and/or less fields as shown in FIG. 3A.

According to some aspects, the IE 300 can include an element ID field 301. The element ID field 301 can be used to identify the IE 300 as the enhanced security selector suite IE. The element ID field 301 can be a unique identifier for identifying the enhanced security selector suite IE. In some examples, the element ID field 301 can have a length of 1 octet but the aspects of this disclosure are not limited to this example.

The IE 300 can further include a length field 303. The length field 303 can indicate the length of the IE 300. In some examples, the length field 303 can have a length of 1 octet but the aspects of this disclosure are not limited to this example.

The IE 300 can further include an Organizationally Unique Identifier (OUI) field 305. The OUI field 305 can be a field that uniquely identifies a vendor, manufacturer, and/or other organization. The OUI field can have a fixed value (e.g., 00-0F-AC in an example) and/or can have a vendor specific value. In some examples, the OUI 305 can have a length of 3 octet but the aspects of this disclosure are not limited to this example.

The IE 300 can further include a version field 307. The version field 307 can indicate with which version of the security suite table(s) 256 the IE 300 is associated. In other words, the AP and/or the STA can store different versions of the security suite tables 256 (e.g., different versions of Table 1). The version field 307 can indicate which version of the security suite table is being using with the IE 300. In some examples, the version field 307 can have a length of 2 octet but the aspects of this disclosure are not limited to this example.

The IE 300 can further include one or more security suite fields 309*a*-309*n* (herein also referred to as security suite field 309) having respective selector fields 311*a*-311*n* and control flags fields 313*a*-313*n*. Each security suite field 309 can be used as a pointer that identifies a row of the security suite table 256 (e.g., security suite table of Table 1). Each security suite field 309 can include a respective selector field 311 and control flags field 313. According to some aspects, the selector field 311 includes the suite ID from the security suite table 256 (e.g., security suite table of Table 1) that identifies the AKM, the pairwise cipher, the group cipher, and/or the group integrity protection cipher that is to be used. In some examples, the selector field 311 can have a length of 2 octet but the aspects of this disclosure are not limited to this example.

The control flags field 313 of each security suite field 309 can be used to enable or disable the security mechanism indicated by the corresponding selector 311. For example, the control flags field 313*a* of security suite field 309*a* can be used to enable or disable the security mechanism indicated by the corresponding selector 311*a*. For example, a first bit of the control flags field 313*a* of security suite field 309*a* can be set to a first value (e.g., "1") to enable the security mechanism indicated by the corresponding selector 311*a*. The first bit of the control flags field 313*a* of security suite field 309*a* can be set to a second value (e.g., "0"—different from the first value) to disable the security mechanism indicated by the corresponding selector 311*a*. The control flag field 313 can prevent new clients from using the corresponding security suite (e.g., using enable/disable discussed). For example, the control flag field 313 (e.g., using the first bit of the control flag field 313) is used to prevent STAs from roaming to an AP with a lesser security suite. The AP can disable a security suite for future associations and can prevent STAs that have already associated using the AKM of that security suite (prior to unsetting that bit of the control flag field 313), from roaming to another AP that is advertising a security suite of lesser strength.

Additionally, or alternatively, the control flags field 313 of each security suite field 309 can be used to enable or disable the transition mode security mechanism indicated by the corresponding selector 311. For example, the control flags field 313*a* of security suite field 309*a* can be used to enable or disable the transition mode security mechanism indicated by the corresponding selector 311*a*. For example, a second bit (e.g., different from the first bit) of the control flags field 313*a* of security suite field 309*a* can be set to a first value (e.g., "1") to enable the transition mode security mechanism indicated by the corresponding selector 311*a*. The second bit of the control flags field 313*a* of security suite field 309*a* can be set to a second value (e.g., "0"—different from the first value) to disable the transition mode security mechanism indicated by the corresponding selector 311*a*. The control flag field 313 can also prevent clients from using the corresponding security suite if the clients support a higher priority suite (e.g., using transition disable discussed).

In some examples, the control flags field 313 can have a length of 1 octet but the aspects of this disclosure are not limited to this example.

By using the IE 300, the AP and/or the STA can explicitly list the security mechanisms (e.g., the security suites) that the AP and/or the STA supports. According to some aspects, each one of the one or more security suite fields 309*a*-309*n* is an atomic structure that can be independently controlled using its corresponding control flag fields 313*a*-313*n* as discussed above. According to some aspects, "atomic" herein refers to each one of the security suite fields 309*a*-309*n* being independent from other ones of the security suite fields 309*a*-309*n*. For example, each security suite field 309 can include information that is independent from other security suite fields 309. Additionally, or alternatively, each security suite field 309 can be controlled (e.g., using its corresponding control flag field 313) independently (e.g., separately) from other security suite fields 309. Additionally, or alternatively, each security suite field 309 can point to a pre-determined, standardized structure. In an example, if the AP wants to advertise AKM8 with GCMP and CCMP as possible ciphers, the AP advertises the security suite field 309*a* for AKM8 and GCMP AND the security suite field 309*b* for AKM8 and CCMP. Each one of these combinations would have a pre-determined, standardized numeric pointer value assigned to it. The structure that the pointer points to is non-changing and atomic.

In some examples, the IE 300 can provide a priority of the one or more security suite fields 309*a*-309*n*. For example, the IE 300 can list the one or more security suite fields 309*a*-309*n* from a least preferred security suite to a most preferred security suite. In another example, the IE 300 can list the one or more security suite fields 309*a*-309*n* from the most preferred security suite to the least preferred security suite.

According to some aspects, a beacon integrity protection can be used with the IE 300 to prevent downgrade attacks.

Figure 3B:
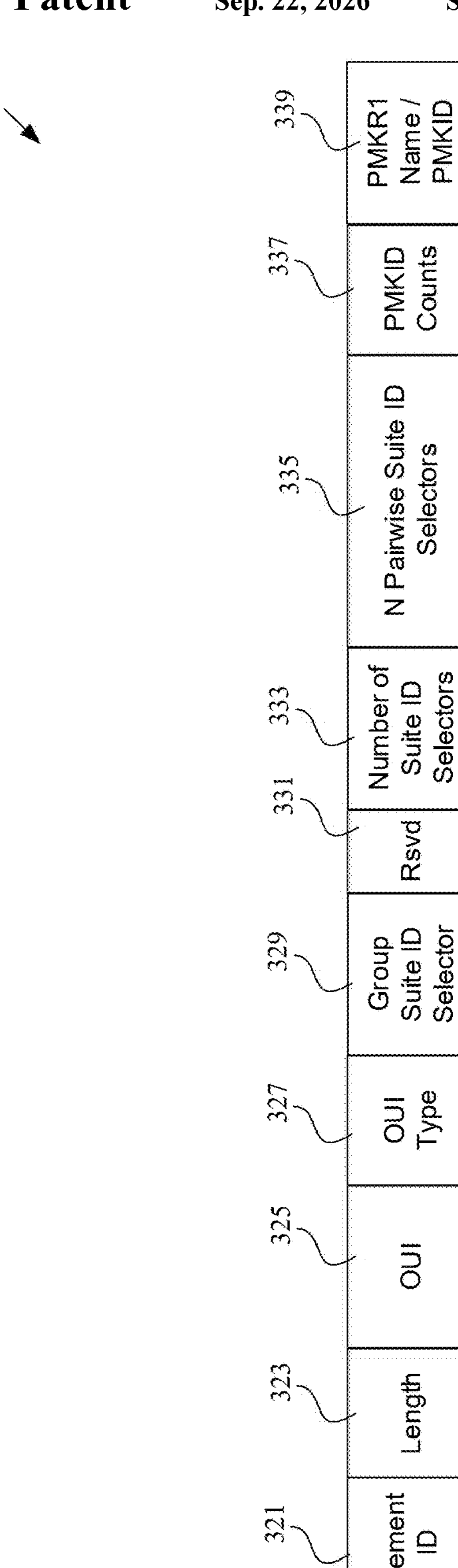
FIG. 3B illustrates another example information element (IE) for implementing multi-credential mapping mechanisms in a communication network, according to some aspects.

FIG. 3B illustrates another example information element (IE) 320 for implementing multi-credential mapping mechanisms in a communication network, according to some aspects. The IE 320 can be one example of the enhanced security selector suite IE that the AP and/or the STA use to communicate the suite IDs, which points to row(s) of the security suite table. According to some aspects, IE 320 is in addition to, or alternatively to, IE 300 of FIG. 3A. According to some aspects, IE 320 is part of IE 300.

The IE 320 can include a plurality of fields. Although some exemplary fields are discussed with respect to FIG. 3B, the IE 320 (e.g., the enhanced security selector suite IE) can include additional fields. The IE 320 can include other fields and/or less fields as shown in FIG. 3B.

According to some aspects, the IE 320 can include an element ID field 321, similar to the element ID field 301, to identify the IE 320 as the enhanced security selector suite IE. The IE 320 can further include a length field 323, similar to the length field 303, that indicates the length of the IE 320. The IE 300 can further include an OUI field 325, similar to the OUI field 305, that uniquely identifies a vendor, manufacturer, and/or other organization. The IE 320 can further include an OUI type field 327 that can identify what the vendor, manufacturer, and/or other organization is using the IE 320 for. In some examples, the OUI type field 327 can have a length of 1 octet but the aspects of this disclosure are not limited to this example.

The IE 320 can further include a group suite ID selector field 329. The group suite ID selector field 329 includes a group cipher suite ID. The group cipher suite ID of the group suite ID selector field 329 can be used as a pointer that identifies a row of the security table(s) 256 (e.g., the group cipher suite selector Table 3.) According to some aspects, the group suite ID selector field 329 includes the group cipher suite ID from the security suite table 256 (e.g., the group cipher suite selector Table 3) that identifies the group cipher and/or the group integrity protection cipher that is to be used. In some examples, the group suite ID selector field 329 can have a length of 1 octet but the aspects of this disclosure are not limited to this example.

The IE 320 can further include a reserved field 331. In some examples, the reserved field 331 can have a length of 2 octets but the aspects of this disclosure are not limited to this example. The reserved field 331 can be used if the group suite ID selector field 329 communicates more than one group cipher suite ID.

The IE 320 can further include a number of suite ID selectors field 333. The number of suite ID selectors field 333 can indicate the number of the pairwise suite IDs that are included in the N pairwise suite ID selectors field 335. In other words, the IE 320 can include one or more pairwise suite IDs in the N pairwise suite ID selectors field 335. The number of suite ID selectors field 333 can indicate how many pairwise suite IDs are communicated in the N pairwise suite ID selectors field 335. The N pairwise suite ID selectors field 335 includes the one or more pairwise suite IDs. Each one of the one or more pairwise suite IDs in the N pairwise suite ID selectors field 335 can be used as a pointer that identifies a row of the security table(s) 256 (e.g., the pairwise security suite selector Table 2) that identifies the AKM and/or the pairwise cipher that is to be used. In some examples, the number of suite ID selectors field 333 can have a length of 1 octet but the aspects of this disclosure are not limited to this example. In some examples, each one of the one or more pairwise suite IDs in the N pairwise suite ID selectors field 335 can have a length of 1 octet but the aspects of this disclosure are not limited to this example.

In some examples, the IE 320 can provide a priority of the one or more pairwise suite IDs in the N pairwise suite ID selectors field 335. For example, the IE 320 can list the one or more pairwise suite IDs in the N pairwise suite ID selectors field 335 from a least preferred security suite to a most preferred security suite. In another example, the IE 320 can list the one or more pairwise suite IDs in the N pairwise suite ID selectors field 335 from the most preferred security suite to the least preferred security suite.

According to some aspects, the one or more pairwise suite IDs in the N pairwise suite ID selectors field 335 can be part of the one or more security suite fields 309*a*-309*n* of FIG. 3A.

By using the IE 320, the AP and/or the STA can explicitly list the security mechanisms (e.g., the security suites) that the AP and/or the STA supports. According to some aspects, each one of the one or more pairwise suite IDs in the N pairwise suite ID selectors field 335 is an atomic structure that can be independently controlled and/or communicated. According to some aspects, "atomic" herein refers to each one of the one or more pairwise suite IDs in the N pairwise suite ID selectors field 335 being independent from other ones of the one or more pairwise suite IDs in the N pairwise suite ID selectors field 335.

The IE 320 can further include Pairwise Master Key Identifier (PMKID) counts field 337 and PMK Rekeying-1 (PMKR1) name/PMKID field 339. The PMKR1 name/PMKID field 339 can be used for fast transition. In some examples, the PMKID counts field 337 can have a length of 1 octet but the aspects of this disclosure are not limited to this example. In some examples, the PMKR1 name/PMKID field 339 can have a length of 16 octets but the aspects of this disclosure are not limited to this example.

According to some aspects, the enhanced security selector suite IEs of this disclosure can be used to communicate security parameters at multi-link device (MLD) and/or multi-link multi-device (MLMD) level to provide a clear separation between multi-link (ML) operation and non-ML. The MLMD level can include a plurality of MLD APs. At the MLD level, each MLD AP can be configured to operate at multiple links (e.g., 2.4 GHz, 5 GHz, and/or 6 GHz links). The MLD AP can communicate with an MLD STA. The MLD STA can be configured to operate at multiple links (e.g., 2.4 GHz, 5 GHz, and/or 6 GHz links). At the link level, the MLD AP communicates with the MLD STA at a specific link (e.g., 2.4 GHz, 5 GHz, and/or 6 GHz links).

According to some aspect, RSN IE and associated security configurations can be used for operations at a per link level (e.g., 2.4 GHz, 5 GHz, or 6 GHz link between the MLD AP and the MLD STA). The MLMD operation has same security configuration across multiple MLD APs and the MLD operation has same security configuration across all links (e.g., a minimum of AKM 24).

According to some aspects, the enhanced security selector suite IEs of this disclosure communicate security parameters at MLD/MLMD level and provide clear separation between non-ML and ML operation. Using the enhanced security selector suite IE at the MLD/MLMD level has no impact to legacy or non-ML operation and new STAs can choose to ignore the RSN IE. The enhanced security selector suite IE can be added to ML element or additional signaling can be added to the enhanced security selector suite IE. The MLMD uses the enhanced security selector suite IE. In some aspects, the enhanced security selector suite IE can be implemented as a software feature. However, the aspects of this disclosure are not limited to these examples.

Figure 4A:
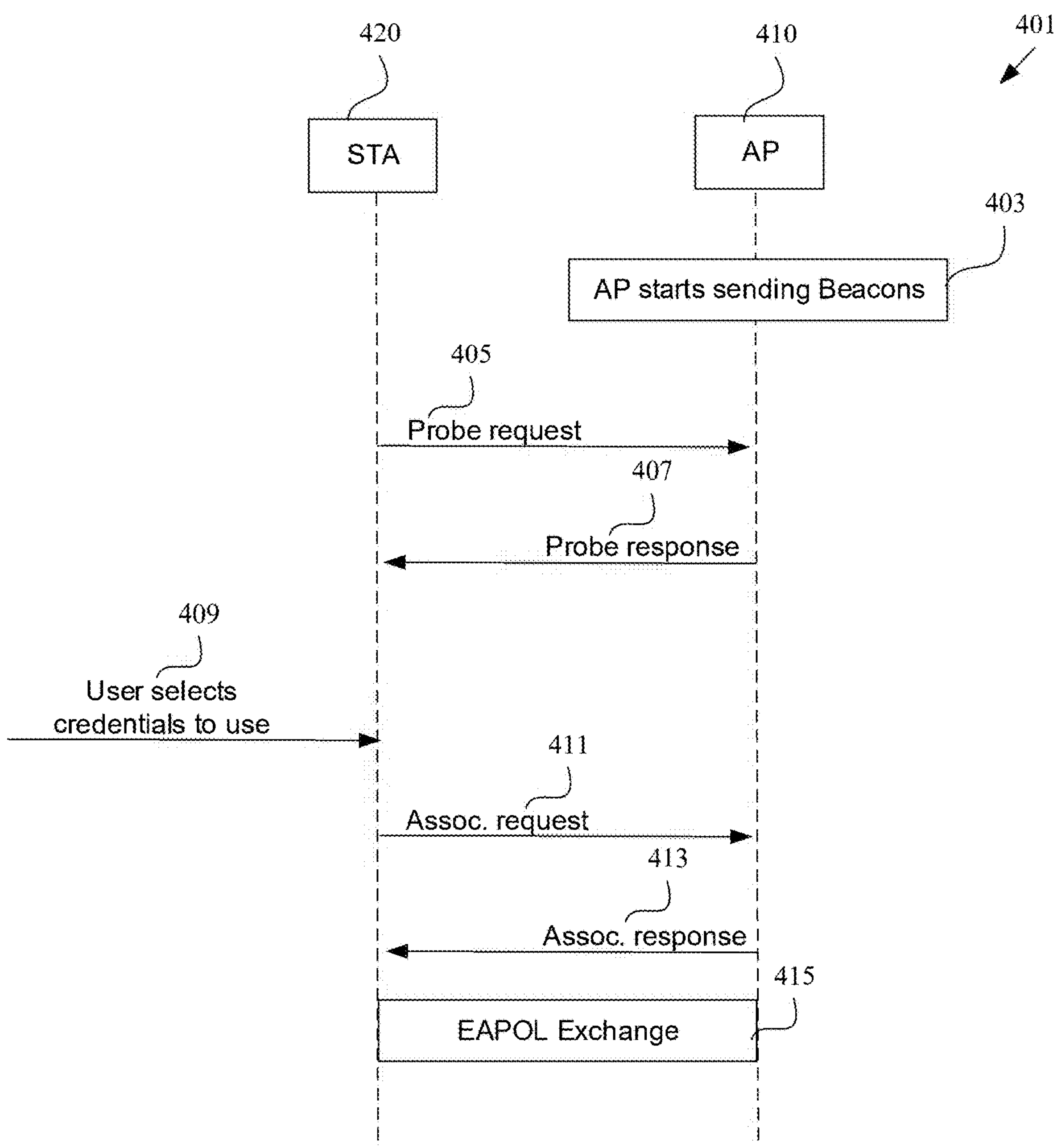
FIG. 4A illustrates an example communication between an access point (AP) and a station (STA) for multi-credential mapping mechanisms in a communication network, according to some aspects.

FIG. 4A illustrates one exemplary communication 401 between AP 410 and STA 420 for multi-credential mapping mechanisms in a communication network, according to some aspects. As a convenience and not a limitation, FIG. 4A may be described with regard to elements of FIGS. 1-3.

The AP 410 can be AP 110 of FIG. 1 and the STA 420 can be one or more of STAs 120 of FIG. 1. According to some aspects, the AP 410 can transmit one or more beacon frames 403. One or more of the beacon frames 403 can include an AP enhanced security selector suite IE (e.g., the IE 300 of FIG. 3A and/or the IE 320 of FIG. 3B). By transmitting the AP enhanced security selector suite IE using the beacon frame 403, the AP 410 can indicate to the STA 420 (and/or other STAs and/or other APs) the AKM, the pairwise cipher, the group cipher, and/or the group integrity protection cipher that the AP 410 supports. Also, by transmitting the AP enhanced security selector suite IE using the beacon frame 403, the AP 410 can indicate to the STA 420 (and/or other STAs and/or other APs) the enabled or restricted security suites.

Figure 4B:
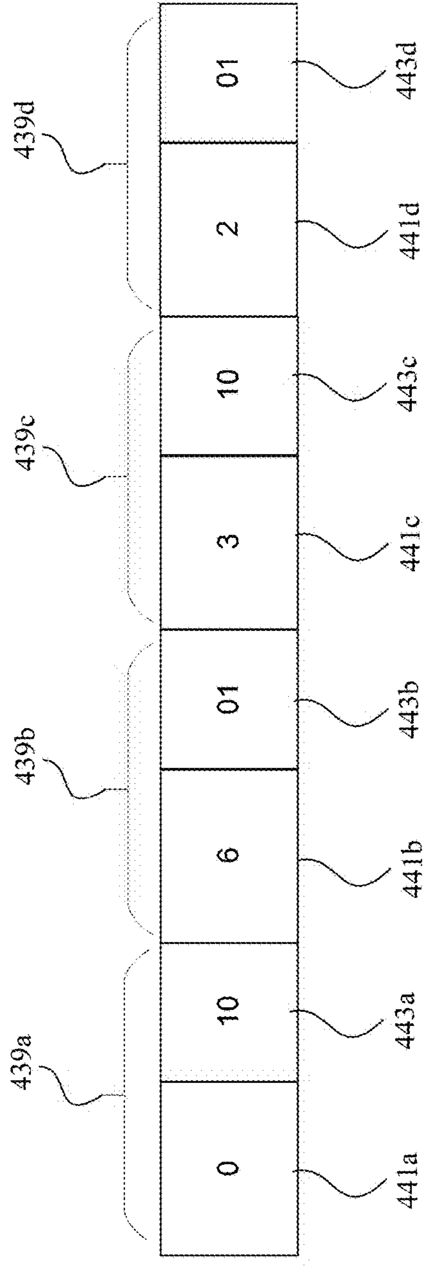
FIG. 4B illustrates an example of security suite fields of an AP enhanced security selector suite IE, according to some aspects.

In an example, the AP 410 can transmit an AP enhanced security selector suite IE that includes security suite fields 439*a*-439*d* shown in FIG. 4B. Only security suite fields 439*a*-439*d* of the AP enhanced security selector suite IE are shown as the example. The security suite field 439*a* includes the selector field 441*a* with a suite ID of 0 from Table 1. The security suite field 439*a* further includes the control flags field 443*a* with a control value of 10. The security suite field 439*b* includes the selector field 441*b* with a suite ID of 6 from Table 1. The security suite field 439*b* further includes the control flags field 443*b* with a control value of 01. The security suite field 439*c* includes the selector field 441*c* with a suite ID of 3 from Table 1. The security suite field 439*c* further includes the control flags field 443*c* with a control value of 10. The security suite field 439*d* includes the selector field 441*d* with a suite ID of 2 from Table 1. The security suite field 439*d* further includes the control flags field 443*d* with a control value of 01.

In this example, the AP 410 has enabled AKM 24 and AKM 12 with both GCMP256 (256-bit Galois/Counter Mode Protocol) and CCMP256 (Counter Mode with Cipher Block Chaining Message Authentication Code Protocol). By setting control flags field to 01, the AP 410 is using CCMP-256 as the group cipher and the AP 410 is using CMAC-256 (Cipher-based Message Authentication Code) for integrity protection. Also, the AP 410 is disallowing new STAs with CCMP256 capabilities from joining the BSS.

In other words, in this example, if the AP 410 supports suite IDs 0 and 6 (selector field 441*a* and selector field 441*b*), the AP 410 supports AKM 24 and group ciphers 9 and 10 (see Table 1 above). In some examples, for this exemplary enhanced security selector suite IE, the STAs use group cipher 10 that is the weaker of the two group cipher. Pairwise cipher is negotiated separately between the AP 410 and the STA 420. Additionally, or alternatively, the AP 410 can allow or disallow the STAs to use weaker ciphers for the same AKM using the control flags field. For example, the control flags field 443*a* is set a first value (e.g., "10") to indicate that the STA 420 can use weaker ciphers (e.g., weaker group ciphers) for the same AKM. The AP 410 can set the control flags field 443*b* to a second value (e.g., "01") to indicate that the STA 420 cannot use weaker ciphers (e.g., weaker group ciphers) for the same AKM.

Figure 4C:
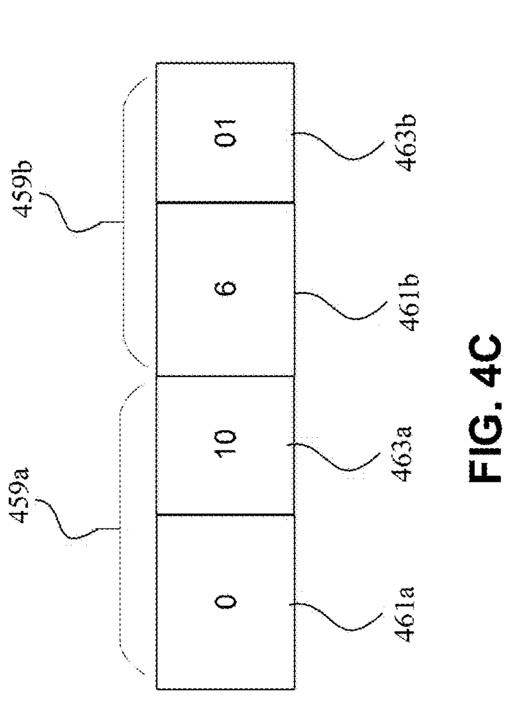
FIG. 4C illustrates an example of security suite fields of an STA enhanced security selector suite IE, according to some aspects.
Figures 4D, 4E:
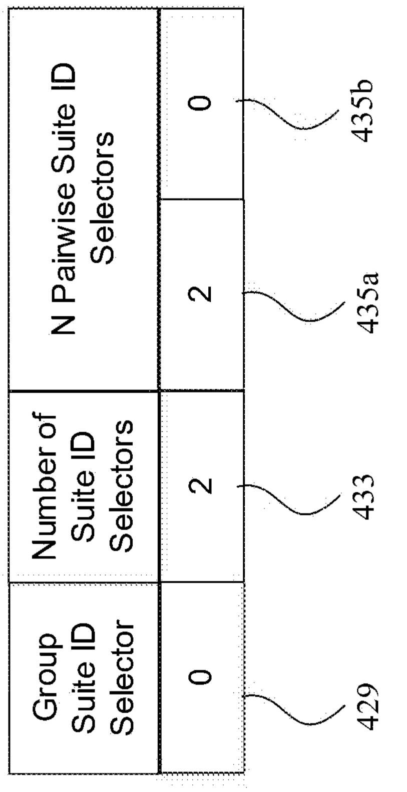
FIG. 4D illustrates another example of security suite fields (e.g., group suite ID selector field and pairwise suite ID selector field(s)) of an AP enhanced security selector suite IE, according to some aspects.
FIG. 4E illustrates another example of security suite fields (e.g., group suite ID selector field and pairwise suite ID selector field(s)) of an STA enhanced security selector suite IE, according to some aspects.

In an example, the AP 410 can transmit an AP enhanced security selector suite IE that includes the group suite ID selector field 429, the number of suite ID selectors 433, and the pairwise suite ID selectors fields 435*a* and 435*b* as shown in FIG. 4D. Only the group suite ID selector field 429, the number of suite ID selectors 433, and the pairwise suite ID selectors fields 435*a* and 435*b* of the AP enhanced security selector suite IE are shown as the example. The AP enhanced security selector suite IE of FIG. 4D is based on the enhanced security selector suite IE 320 of FIG. 3B. In this example, the group suite ID selector field 429 includes the group cipher suite ID 0 from Table 3. The number of suite ID selectors 433 includes a value of 2 indicating that two pairwise suite ID selectors fields 435*a* and 435*b* are in the AP enhanced security selector suite IE. In this example, the pairwise suite ID selectors field 435*a* includes the pairwise suite ID 2 from Table 2. The pairwise suite ID selectors field 435*b* includes the pairwise suite ID 0 from Table 2. By using the group cipher suite ID 0 from Table 3, the AP enhanced security selector suite IE indicates that the AP 410 uses CCMP-128 and BIP-CMAC-128. By using pairwise suite ID 2 from Table 2 the AP enhanced security selector suite IE indicates that the AP 410 uses AKM 12 and GCMP256. By using pairwise suite ID 0 from Table 2 the AP enhanced security selector suite IE indicates that the AP 410 uses AKM 24 and GCMP-256. These values are provided as examples and do not limit the scope of this disclosure.

According to some aspects, the STA 420 sends a probe request 405. The STA 420 can send the probe request at 405 after receiving the one or more beacon frames from the AP 410. The probe request 405 can include a probe request frame to advertise information about the STA 420 and/or to inquire one or more parameters associated with the AP 410. In response, the AP 410 can send probe response 407 to the STA 420. The probe response 407 can include one or more probe response frames including, for example, AP 410 Basic Service Set Identifier (BSSID), supported data rate(s), and other related information. According to some aspects, the AP 410 can send the AP enhanced security selector suite IE (e.g., the IE 300 of FIG. 3A, the IE 320 of FIG. 3B, the enhanced security selector suite IE that includes security suite fields 439*a*-439*d* shown in FIG. 4B, and/or the AP enhanced security selector suite IE that includes the group suite ID selector field 429, the number of suite ID selectors 433, and the pairwise suite ID selectors fields 435*a* and 435*b* shown in FIG. 4D). The AP 410 can send the enhanced security selector suite IE using the beacon frames 403 and/or using the probe response 407.

At 409, a user of the STA 420 can select one or more credentials to use for connecting to and communicating with the AP 410. In some aspects, the one or more credentials are selected based on the STA 420 capabilities and the credentials that the STA 420 supports. Additionally, the one or more credentials can be selected based on the enhanced security selector suite IE that the AP 410 has transmitted. In some aspects, the credential can include one or more of AKMs, pairwise ciphers, group ciphers, group integrity protection ciphers, passcodes, passwords, or the like.

The STA 420 transmits an association request 411 to the AP 410. In some aspects, the association request 411 can include a STA enhanced security selector suite IE (e.g., the IE 300 of FIG. 3A and/or IE 320 of FIG. 3B). By transmitting the STA enhanced security selector suite IE using the association request 411, the STA 420 can indicate to the AP 410 (and/or other STAs and/or other APs) the AKM, the pairwise cipher, the group cipher, and/or the group integrity protection cipher that the STA 420 supports (and/or has selected). Also, by transmitting the STA enhanced security selector suite IE using the association request 411, the STA 420 can indicate to the AP 410 (and/or other STAs and/or other APs) the enabled or restricted security suites.

In an example, the STA 420 can transmit a STA enhanced security selector suite IE that includes security suite fields 459*a*-459*b* shown in FIG. 4C. Only security suite fields 459*a*-459*b* of the STA enhanced security selector suite IE are shown as the example. The security suite field 459*a* includes the selector field 461*a* with a suite ID of 0 from Table 1. The security suite field 459*a* further includes the control flags field 463*a* with a control value of 10. The security suite field 459*b* includes the selector field 461*b* with a suite ID of 6 from Table 1. The security suite field 459*b* further includes the control flags field 463*b* with a control value of 01. In this example, the STA 420 attempts to join the BSS with AKM 24. The STA 420 only enables group cipher/group integrity protection cipher from suite 6. For example, with the control flags field 463*b* with a control value of 01, the AP 410 can disable a security suite for future associations and can prevent STAs that have already associated with the AP 410 using the AKM of that security suite (prior to unsetting that bit of the control flags field 463*b*), from roaming to another AP that is advertising a security suite of lesser strength In an example, the STA 420 can transmit a STA enhanced security selector suite IE that includes the group suite ID selector field 449, the number of suite ID selectors field 453, and the pairwise suite ID selectors field 455 as shown in FIG. 4E. Only the group suite ID selector field 449, the number of suite ID selectors field 453, and the pairwise suite ID selectors field 455 of the STA enhanced security selector suite IE are shown as the example. The STA enhanced security selector suite IE of FIG. 4E is based on the enhanced security selector suite IE 320 of FIG. 3B. In this example, the group suite ID selector field 449 includes the group cipher suite ID 0 from Table 3. According to some aspects, the group suite ID selector field 449 includes the same group cipher suite ID as of the group suite ID selector field 429 of the AP enhanced security selector suite IE of FIG. 4D. The number of suite ID selectors field 453 includes a value of 1 indicating that one pairwise suite ID selectors field 455 is in the STA enhanced security selector suite IE. In this example, the pairwise suite ID selectors field 455 includes the pairwise suite ID 2 from Table 2. According to some aspects, the STA enhanced security selector suite IE includes only a single pairwise suite ID selectors field 455 and therefore, the value of the number of suite ID selectors field 453 is 1. The pairwise suite ID of the pairwise suite ID selectors field 455 is selected from the pairwise suite IDs of the pairwise suite ID selectors fields 435 of the AP enhanced security selector suite IE of FIG. 4D. In other words, the STA chooses a single pairwise suite ID for the pairwise suite IDs of the AP enhanced security selector suite IE. The STA chooses a single pairwise suite ID that the STA supports.

In the example of FIG. 4E, by using the group cipher suite ID 0 from Table 3, the STA enhanced security selector suite IE indicates that the STA 420 selected CCMP-128 and BIP-CMAC-128. By using the group cipher suite ID 2 from Table 3, the STA enhanced security selector suite IE indicates that the STA 420 selected AKM 12 and GCMP256. In other words, the STA 420 joins the BSS with pairwise cipher suite ID 2 and group cipher suite ID 0. These values are provided as examples and do not limit the scope of this disclosure.

In response to the association request 411, the AP 410 can transmit an association response 413. According to some aspects, the association response 413 can indicate that the AP 410 accepts (e.g., confirms) the STA 420 proposed STA enhanced security selector suite IE. Additionally, or alternatively, the association response 413 can include a message to indicate that AP 410 has accepted the STA enhanced security selector suite IE. The message can be a field of the association response 413.

Although FIGS. 4A-4E are discussed with transmitting the enhanced security selector suite IE using beacon frames, probe response, and/or association request, the aspects of this disclosure are not limited to these examples and other messages between the AP 410 and the STA 420 can be used for communication the enhanced security selector suite IEs.

After the AP 410 and the STA 420 have agreed on the security mechanism to use, the AP 410 and the STA 420 can use the agreed-on security mechanism to communicate with each other. For example, the AP 410 and the STA 420 can use the agreed-on security mechanism for an Extensible Authentication Protocol (EAP) over LAN (EAPOL Protocol) 415. The AP 410 and the STA 420 can use other protocols for authentication and communication using the agreed-on security mechanism.

Figure 5:
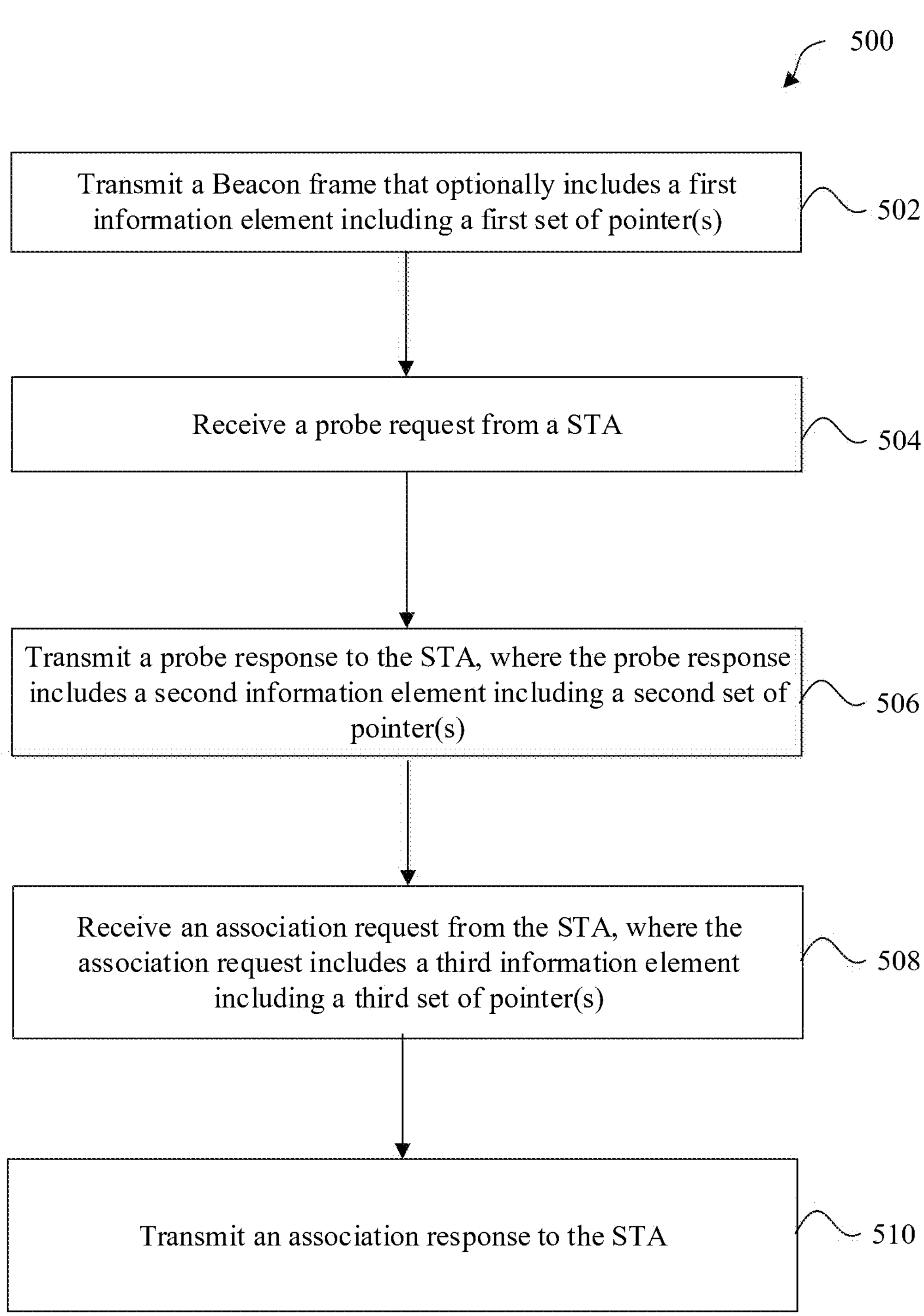
FIG. 5 illustrates an example method for a wireless system (e.g., an AP) supporting and implementing multi-credential mapping mechanisms, according to some aspects.

FIG. 5 illustrates an example method 500 for a wireless system supporting and implementing multi-credential mapping mechanisms, according to some aspects. As a convenience and not a limitation, FIG. 5 may be described with regard to elements of FIGS. 1-4. Method 500 may represent the operation of an electronic device (e.g., an AP as discussed in this disclosure) implementing multi-credential mapping mechanisms. Method 500 may also be performed by system 200 of FIG. 2 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5. According to some aspects, method 500 may represent the operation of the AP 110 as discussed with respect to FIG. 1 and/or the AP 410 as discussed with respect to FIG. 4.

At 502, a beacon frame is transmitted. For example, an AP (e.g., the AP 110 and/or the AP 410) transmits a beacon frame. The AP can transmit more than one beacon frame. The beacon frame or each of (or a subset of) a plurality of beacon frames can optionally include a first enhanced security selector suite IE. As discussed above, the AP can transmit a first enhanced security selector suite IE with the beacon frame and a second enhanced security selector suite IE with the probe response. Alternatively, the AP transmits a first enhanced security selector suite IE with the probe response and the AP does not transmit any enhanced security selector suite IE with the beacon frame. The first enhanced security selector suite IE can include a first set of one or more pointers. As discussed above, one or more pointers are the suite IDs that are located within the selector fields of the enhanced security selector suite IE. The first set of one or more pointers (e.g., the first set of suite IDs) in the first enhanced security selector suite IE indicate, for example, a first set of rows of the security suite table (e.g., Table 1) that is stored in the AP (e.g., AP 110 and/or AP 410) and/or in the STAs (e.g., STAs 120 and/or STA 420). The first enhanced security selector suite IE can include other fields as discussed above, for example, with respect to FIGS. 3A and 4A-4C.

Additionally, or alternatively, the first enhanced security selector suite IE can include a first set of pointers that are the group cipher suite ID(s) and the pairwise suite ID(s) that are located within the group suite ID selector field(s) and the pairwise suite ID selector field(s) of the enhanced security selector suite IE. The first set of pointers (e.g., the first set of group cipher suite ID(s) and pairwise suite ID(s)) in the first enhanced security selector suite IE indicate, for example, a first set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). The first enhanced security selector suite IE can include other fields as discussed above, for example, with respect to FIGS. 3B and 4A, 4D-4E.

At 504, a probe request is received. For example, the AP can receive a probe request from the STA. The probe request can be a probe request frame. At 506, a probe response is transmitted to the STA. For example, in response to receiving the probe request, the AP can transmit a probe response to the STA. The probe response can be a probe response frame.

In some aspects, the probe response can include a second enhanced security selector suite IE. The second enhanced security selector suite IE can include a second set of one or more pointers. As discussed above, the AP can transmit a first enhanced security selector suite IE with the beacon frame and a second enhanced security selector suite IE with the probe response. Alternatively, the AP transmits a first enhanced security selector suite IE with the probe response and the AP does not transmit any enhanced security selector suite IE with the beacon frame.

As discussed above, the one or more pointers are the suite IDs that are located within the selector fields of the enhanced security selector suite IE. The second set of one or more pointers (e.g., the second set of suite IDs) in the second enhanced security selector suite IE indicate, for example, a second set of rows of the security suite table (e.g., Table 1) that is stored in the AP (e.g., AP 110 and/or AP 410) and/or in the STAs (e.g., STAs 120 and/or STA 420). The second enhanced security selector suite IE can include other fields as discussed above, for example, with respect to FIGS. 3A and 4A-4C.

Additionally, or alternatively, the second enhanced security selector suite IE can include a second set of pointers that are the group cipher suite ID(s) and the pairwise suite ID(s) that are located within the group suite ID selector field(s) and the pairwise suite ID selector field(s) of the enhanced security selector suite IE. The second set of pointers (e.g., the second set of group cipher suite ID(s) and pairwise suite ID(s)) in the second enhanced security selector suite IE indicate, for example, a second set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). The second enhanced security selector suite IE can include other fields as discussed above, for example, with respect to FIGS. 3B and 4A, 4D-4E.

In some examples, the second enhanced security selector suite IE is the same as the first enhanced security selector suite IE. In these examples, the AP can retransmit the first enhanced security selector suite IE to make sure the STA has received it. Alternatively, the second enhanced security selector suite IE can be different from the first enhanced security selector suite IE. In these examples, the AP is updating the enhanced security selector suite IE from the time the beacon frame was transmitted to the time the probe response is being transmitted. In some example, the first enhanced security selector suite IE may be optional and the AP may not send the first enhanced security selector suite IE with the probe response. In some example, the second enhanced security selector suite IE may be optional and the AP may not send the second enhanced security selector suite IE with the probe response.

At 508, an association request is received. For example, the AP can receive an association request from the STA. The association request can be an association request frame. The association request can include a third enhanced security selector suite IE. The third enhanced security selector suite IE can include a third set of one or more pointers. As discussed above, one or more pointers are the suite IDs that are located within the selector fields of the enhanced security selector suite IE. The third set of one or more pointers (e.g., the third set of suite IDs) in the third enhanced security selector suite IE indicate, for example, a third set of rows of the security suite table (e.g., Table 1) that is stored in the AP (e.g., AP 110 and/or AP 410) and/or in the STAs (e.g., STAs 120 and/or STA 420). The third enhanced security selector suite IE can include other fields as discussed above, for example, with respect to FIGS. 3A and 4A-4C. The third enhanced security selector suite IE indicates the security suites that the STA can support.

Additionally, or alternatively, the third enhanced security selector suite IE can include a third set of pointers that are the group cipher suite ID(s) and the pairwise suite ID(s) that are located within the group suite ID selector field(s) and the pairwise suite ID selector field(s) of the enhanced security selector suite IE. The third set of pointers (e.g., the third set of group cipher suite ID(s) and pairwise suite ID(s)) in the third enhanced security selector suite IE indicate, for example, a third set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). As discussed above, the AP and the STAs can store the same copies of the Tables 1-3. The third enhanced security selector suite IE can include other fields as discussed above, for example, with respect to FIGS. 3B and 4A, 4D-4E.

In some aspects, the third set of one or more pointers of the third enhanced security selector suite IE can be the same as the first (or second) set of one or more pointers of the first (or second) enhanced security selector suite IE. Additionally, or alternatively, the third set of one or more pointers of the third enhanced security selector suite IE can be a subset of the first (or second) set of one or more pointers of the first (or second) enhanced security selector suite IE. For example, the third set of pointers can include a single group cipher suite ID and a single pairwise suite ID. The single group cipher suite ID can be the same as the group cipher suite ID of the first (or second) set of one or more pointers of the first (or second) enhanced security selector suite IE. The single pairwise suite ID can be selected (e.g., by the UE) from the one or more pairwise suite IDs of the first (or second) set of one or more pointers of the first (or second) enhanced security selector suite IE. Additionally, or alternatively, some of the third set of one or more pointers of the third enhanced security selector suite IE can be different from some of the first (or second) set of one or more pointers of the first (or second) enhanced security selector suite IE.

At 510, an association response is transmitted. For example, the AP can transmit an association response to the STA. The association response can be an association response frame. In some aspects, the association response indicates to the STA that the AP accepts (e.g., confirms) the STA's proposed enhanced security selector suite IE.

According to some aspects, the STA and the AP use the security suites supported by both STA and AP and confirmed using method 500 to communicate with each other.

Figure 6:
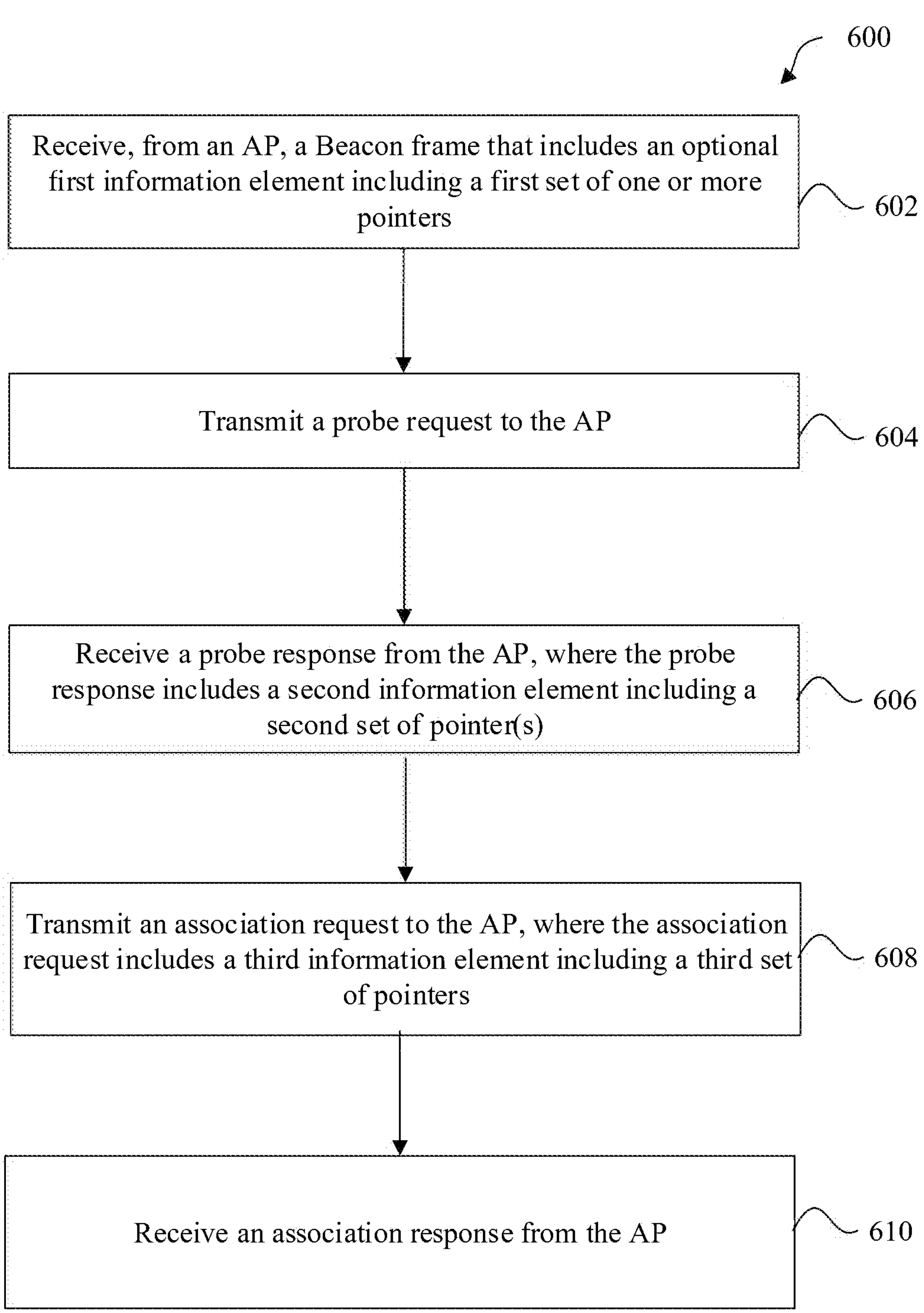
FIG. 6 illustrates an example method for a wireless system (e.g., a STA) supporting and implementing multi-credential mapping mechanisms, according to some aspects.

FIG. 6 illustrates an example method 600 for a wireless system supporting and implementing multi-credential mapping mechanisms, according to some aspects. As a convenience and not a limitation, FIG. 6 may be described with regard to elements of FIGS. 1-5. Method 600 may represent the operation of an electronic device (e.g., a STA as discussed in this disclosure) implementing multi-credential mapping mechanisms. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6. According to some aspects, method 600 may represent the operation of the STA 120 as discussed with respect to FIG. 1 and/or the STA 420 as discussed with respect to FIG. 4.

At 602, a beacon frame is received. For example, a STA (e.g., STA 120 and/or STA 420) receives one or more beacon frames from an AP (e.g., the AP 110 and/or the AP 410). The beacon frame or each of (or a subset of) a plurality of beacon frames can optionally include a first enhanced security selector suite IE. As discussed above, the AP can transmit a first enhanced security selector suite IE with the beacon frame and a second enhanced security selector suite IE with the probe response. Alternatively, the AP transmits a first enhanced security selector suite IE with the probe response and the AP does not transmit any enhanced security selector suite IE with the beacon frame. The first enhanced security selector suite IE can include a first set of one or more pointers. As discussed above, one or more pointers are the suite IDs that are located within the selector fields of the enhanced security selector suite IE. The first set of one or more pointers (e.g., the first set of suite IDs) in the first enhanced security selector suite IE indicate, for example, a first set of rows of the security suite table (e.g., Table 1) that is stored in the AP (e.g., AP 110 and/or AP 410) and/or in the STAs (e.g., STAs 120 and/or STA 420). The first enhanced security selector suite IE can include other fields as discussed above, for example, with respect to FIGS. 3A and 4A-4C.

Additionally, or alternatively, the first enhanced security selector suite IE can include a first set of pointers that are the group cipher suite ID(s) and the pairwise suite ID(s) that are located within the group suite ID selector field(s) and the pairwise suite ID selector field(s) of the enhanced security selector suite IE. The first set of pointers (e.g., the first set of group cipher suite ID(s) and pairwise suite ID(s)) in the first enhanced security selector suite IE indicate, for example, a first set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). The first enhanced security selector suite IE can include other fields as discussed above, for example, with respect to FIGS. 3B and 4A, 4D-4E.

At 604, a probe request is transmitted. For example, the STA can transmit a probe request to the AP. The probe request can be a probe request frame. At 606, a probe response is received from the AP. For example, in response to transmitting the probe request, the STA can receive a probe response from the AP. The probe response can be a probe response frame.

In some aspects, the probe response can include a second enhanced security selector suite IE. The second enhanced security selector suite IE can include a second set of one or more pointers. As discussed above, the AP can transmit a first enhanced security selector suite IE with the beacon frame and a second enhanced security selector suite IE with the probe response. Alternatively, the AP transmits a first enhanced security selector suite IE with the probe response and the AP does not transmit any enhanced security selector suite IE with the beacon frame.

As discussed above, the one or more pointers are the suite IDs that are located within the selector fields of the enhanced security selector suite IE. The second set of one or more pointers (e.g., the second set of suite IDs) in the second enhanced security selector suite IE indicate, for example, a second set of rows of the security suite table (e.g., Table 1) that is stored in the AP (e.g., AP 110 and/or AP 410) and/or in the STAs (e.g., STAs 120 and/or STA 420). The second enhanced security selector suite IE can include other fields as discussed above, for example, with respect to FIGS. 3A and 4A-4C.

Additionally, or alternatively, the second enhanced security selector suite IE can include a second set of pointers that are the group cipher suite ID(s) and the pairwise suite ID(s) that are located within the group suite ID selector field(s) and the pairwise suite ID selector field(s) of the enhanced security selector suite IE. The second set of pointers (e.g., the second set of group cipher suite ID(s) and pairwise suite ID(s)) in the second enhanced security selector suite IE indicate, for example, a second set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). The second enhanced security selector suite IE can include other fields as discussed above, for example, with respect to FIGS. 3B and 4A, 4D-4E.

In some examples, the second enhanced security selector suite IE is the same as the first enhanced security selector suite IE. In these examples, the AP can retransmit the first enhanced security selector suite IE to make sure the STA has received it. Alternatively, the second enhanced security selector suite IE can be different from the first enhanced security selector suite IE. In these examples, the AP is updating the enhanced security selector suite IE from the time the beacon frame was transmitted to the time the probe response is being transmitted. In some example, the first enhanced security selector suite IE may be optional and the AP may not send the first enhanced security selector suite IE with the probe response. In some example, the second enhanced security selector suite IE may be optional and the AP may not send the second enhanced security selector suite IE with the probe response.

At 608, an association request is transmitted. For example, the STA can transmit an association request from to the AP. The association request can be an association request frame. In some aspects, the STA transmits the association request based on a selection made at the STA. For example, one or more credentials to be used by the STA is selected. The selection can be done by a user of the STA, in some examples. The association request is transmitted in response the selection.

The association request can include a third enhanced security selector suite IE. The third enhanced security selector suite IE can include a third set of one or more pointers. As discussed above, one or more pointers are the suite IDs that are located within the selector fields of the enhanced security selector suite IE. The third set of one or more pointers (e.g., the third set of suite IDs) in the third enhanced security selector suite IE indicate, for example, a third set of rows of the security suite table (e.g., Table 1) that is stored in the AP (e.g., AP 110 and/or AP 410) and/or in the STAs (e.g., STAs 120 and/or STA 420). The third enhanced security selector suite IE can include other fields as discussed above, for example, with respect to FIGS. 3A and 4A-4C. The third enhanced security selector suite IE indicates the security suites that the STA can support.

Additionally, or alternatively, the third enhanced security selector suite IE can include a third set of pointers that are the group cipher suite ID(s) and the pairwise suite ID(s) that are located within the group suite ID selector field(s) and the pairwise suite ID selector field(s) of the enhanced security selector suite IE. The third set of pointers (e.g., the third set of group cipher suite ID(s) and pairwise suite ID(s)) in the third enhanced security selector suite IE indicate, for example, a third set of rows of the group cipher suite selector table (e.g., Table 3) and the pairwise security suite selector table (e.g., Table 2) that are stored in the AP (e.g., AP 110 and/or AP 410) and/or in the STAs (e.g., STAs 120 and/or STA 420). As discussed above, the AP and the STAs can store the same copies of the Tables 1-3. The third enhanced security selector suite IE can include other fields as discussed above, for example, with respect to FIGS. 3B and 4A, 4D-4E.

In some aspects, the third set of one or more pointers of the third enhanced security selector suite IE can be the same as the first (or second) set of one or more pointers of the first (or second) enhanced security selector suite IE. Additionally, or alternatively, the third set of one or more pointers of the third enhanced security selector suite IE can be a subset of the first (or second) set of one or more pointers of the first (or second) enhanced security selector suite IE. For example, the third set of pointers can include a single group cipher suite ID and a single pairwise suite ID. The single group cipher suite ID can be the same as the group cipher suite ID of the first (or second) set of one or more pointers of the first (or second) enhanced security selector suite IE. The single pairwise suite ID can be selected (e.g., by the UE)

from the one or more pairwise suite IDs of the first (or second) set of one or more pointers of the first (or second) enhanced security selector suite IE. Additionally, or alternatively, some of the third set of one or more pointers of the third enhanced security selector suite IE can be different from some of the first (or second) set of one or more pointers of the first (or second) enhanced security selector suite IE.

At 610, an association response is received. For example, the STA can receive an association response from the AP. The association response can be an association response frame. In some aspects, the association response indicates to the STA that the AP accepts (e.g., confirms) the STA's proposed enhanced security selector suite IE.

The STA can use the third set of pointer(s) of the third enhanced security selector suite IE and the security suite tables to determine the security suites to use for communicating with the AP. In other words, the STA can use the third set of pointer(s) of the third enhanced security selector suite IE to find the corresponding rows of the security suite tables that include the security suites that can be used for the communication between the STA and the AP.

The third enhanced security selector suite IE can be based on the security suites that are supported by both the AP and the STA. The third enhanced security selector suite IE can be selected based on the security suites that are supported by both the AP and the STA and also that are indicated by the STA at 608.

According to some aspects, the STA and the AP use the security suites supported by both STA and AP and confirmed using method 600 to communicate with each other.

According to some aspects, the security suite tables (e.g., Table 1, Table 2, and/or Table 3) can be updated in the AP and/or the STA. The security suite tables can be updated periodically. The security suite tables can be updated each time a change is made to the security suite table. The security suite tables can be updated based on a request at the AP and/or the STA. In some aspects, the security suite tables are defined (and/or updated) in an standard and/or specification that is used by the AP and/or the STA. According to some aspects, the security suite tables can be standardized, so that different manufacturers would be able to have a consistent set of atomic combinations to select from. In some aspects, the standardized security suite tables can disallow dynamic selection of several combinations of AKM and ciphers of the current implementations.

Figure 7:
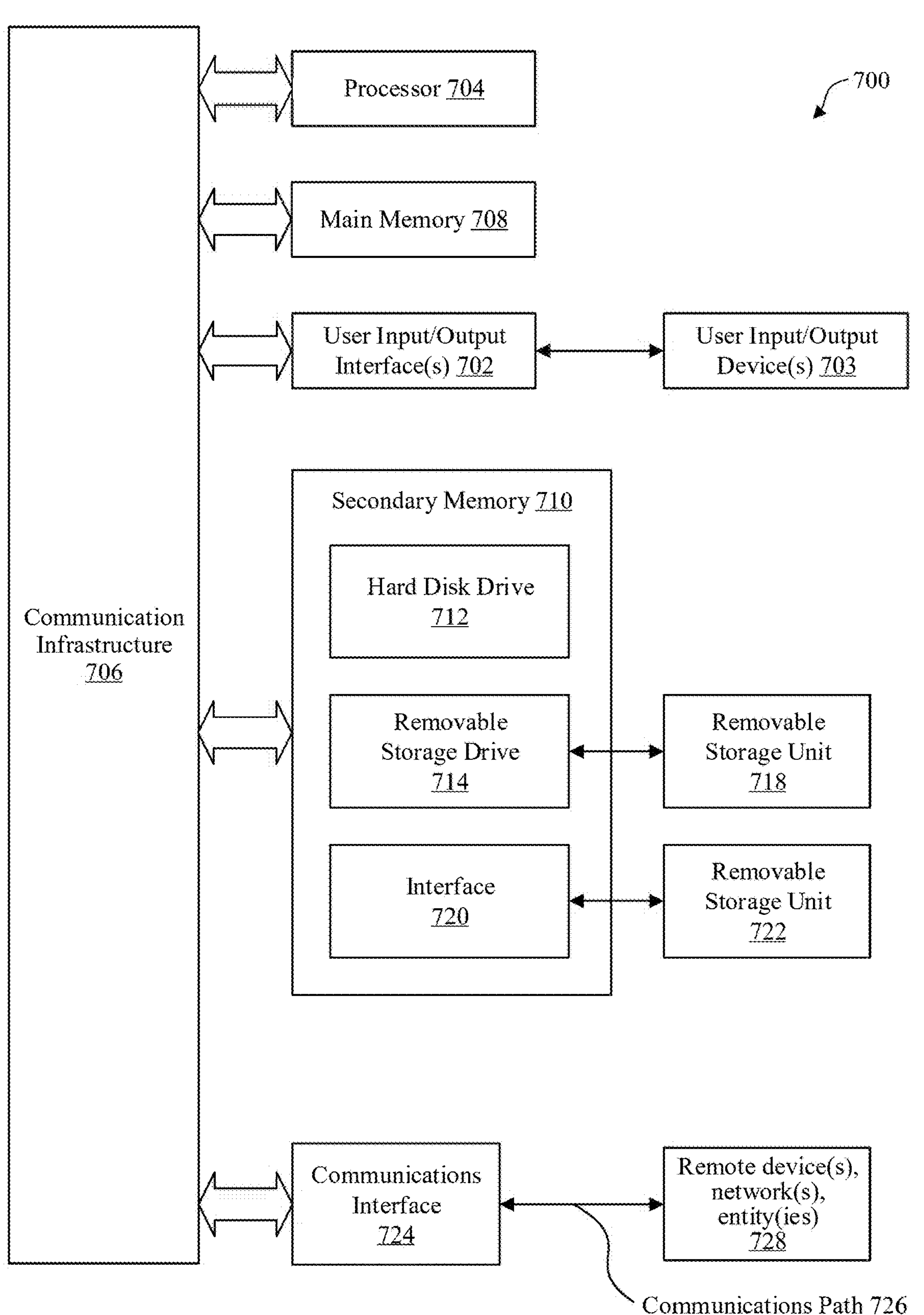
FIG. 7 illustrates an example computer system that can implement some aspects of the disclosure or portion(s) thereof.

Various aspects can be implemented, for example, using one or more computer systems, such as computer system 700 shown in FIG. 7. Computer system 700 can be any computer capable of performing the functions described herein such as devices 110, 120 of FIG. 1 or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 can include one or more levels of cache. Main memory 708 has stored therein control logic (e.g., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

The operations in the preceding aspects can be implemented in a wide variety of configurations and architectures. Therefore, some or all of the operations in the preceding aspects can be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to “one aspect,” “an aspect,” “some aspects,” “an example,” “some examples” or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID’s, home addresses, data or records relating to a user’s health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively “opt in” or “opt out” of participation in the collection of personal information data, e.g., during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:

a transceiver configured to communicate over a wireless network; and a processor, communicatively coupled to the transceiver, and configured to:

receive, using the transceiver and from a second electronic device, a first information element (IE) comprising a first set of pointers indicating a first set of security suites;

transmit, using the transceiver and to the second electronic device, a second IE comprising a second set of pointers indicating a second set of security suites selected from the first set of security suites indicated in the first IE received from the second electronic device;

receive, using the transceiver and from the second electronic device, a response indicating that the second electronic device confirms the second set of security suites; and use the second set of security suites to secure communications with the second electronic device.

2. The electronic device of claim 1, further comprising:

a memory storing a first security suite table and a second security suite table, wherein the processor is further configured to determine the second set of security suites from the first and second security suite tables using the first set of pointers in the first IE to index entries in the first and second security suite tables.

3. The electronic device of claim 1, wherein the processor is configured to receive the first IE in a beacon frame.

4. The electronic device of claim 1, wherein the processor is configured to receive the first IE in a probe response frame.

5. The electronic device of claim 1, wherein the processor is configured to receive the response indicating that the second electronic device confirms the second IE in an association response frame.

6. The electronic device of claim 1, wherein the processor is configured to transmit the second IE using an association request frame.

7. The electronic device of claim 1, wherein the processor is configured to transmit the second IE in response to a selection of one or more credentials at the electronic device.

8. The electronic device of claim 1, wherein at least one of the first IE or the second IE comprises a group suite identifier (ID) selector field and one or more pairwise suite ID selector fields.

9. The electronic device of claim 8, wherein the at least one of the first IE or the second IE further comprises a number of suite ID selectors field indicating a number of the one or more pairwise suite ID selector fields.

10. The electronic device of claim 8, wherein the group suite ID selector field of the first IE includes a pointer of the first set of pointers indicating a row in a first security suite table.

11. The electronic device of claim 10, wherein the group suite ID selector field of the second IE includes a pointer of the second set of pointers indicating the row in the first security suite table.

12. The electronic device of claim 8, wherein the one or more pairwise suite ID selector fields of the first IE include one or more pointers of the first set of pointers indicating a row in a second security suite table.

13. The electronic device of claim 12, wherein the one or more pairwise suite ID selector fields of the second IE include a single pointer of the second set of pointers corresponding to one of the pairwise suite ID selector fields selected from the one or more pointers of the first set of pointers of the first IE.

14. A method, comprising:

receiving, by a first electronic device and from a second electronic device, a first enhanced security selector suite information element (IE) comprising a first set of pointers indicating a first set of security suites;

transmitting, to the second electronic device, a second enhanced security selector suite IE comprising a second set of pointers, selected from the first set of pointers, indicating a second set of security suites;

receiving, from the second electronic device, a response indicating that the second electronic device confirms the second set of security suites; and using the second set of security suites for communicating with the second electronic device.

15. The method of claim 14, further comprising:

determining the second set of security suites from a first security suite table and a second security suite table stored in a memory of the first electronic device using the first set of pointers in the first enhanced security selector suite IE.

16. The method of claim 14, wherein receiving the first enhanced security selector suite IE comprises receiving the first enhanced security selector suite IE in a beacon frame or in a probe response frame.

17. The method of claim 14, wherein the first enhanced security selector suite IE comprises a group suite identifier (ID) selector field, one or more pairwise suite ID selector fields, and a number of suite ID selectors field indicating a number of the one or more pairwise suite ID selector fields.

18. The method of claim 17, wherein the group suite ID selector field of the first enhanced security selector suite IE includes a pointer of the first set of pointers indicating a row in a first security suite table and the one or more pairwise suite ID selector fields of the first enhanced security selector suite IE include one or more pointers of the first set of pointers indicating a row in a second security suite table.

19. The method of claim 18, wherein:

the second enhanced security selector suite IE comprises a group suite ID selector field and a pairwise suite ID selector field, the group suite ID selector field of the second enhanced security selector suite IE includes the pointer of the second set of pointers indicating the row in a first security suite table, and the pairwise suite ID selector field of the second enhanced security selector suite IE includes a single pointer selected from the one or more pointers indicating the row in the second security suite table.

20. An electronic device, comprising:

a transceiver configured to communicate over a wireless network; and a processor communicatively coupled to the transceiver and configured to:

transmit, using the transceiver and to a second electronic device, a first enhanced security selector suite information element (IE) comprising a first set of pointers indicating a first set of security suites;

receive, using the transceiver and from the second electronic device, a second enhanced security selector suite IE comprising a second set of pointers indicating a second set of security suites selected from the first set of security suites indicated by the second electronic device in the first enhanced security selector suite;

transmit, using the transceiver and to the second electronic device, a response confirming the second set of security suites; and use the second set of security suites for communicating with the second electronic device.

* * * * *